(12) United States Patent
Morishita

(10) Patent No.: US 12,155,267 B2
(45) Date of Patent: Nov. 26, 2024

(54) MAGNETIC FIELD GENERATING DEVICE AND ROTATING ELECTRICAL MACHINE

(71) Applicant: Kogakuin University, Tokyo (JP)

(72) Inventor: Mimpei Morishita, Tokyo (JP)

(73) Assignee: Kogakuin University, Tokyo (JP)

( * ) Notice: Subject to any disclaimer, the term of this patent is extended or adjusted under 35 U.S.C. 154(b) by 214 days.

(21) Appl. No.: 17/760,877

(22) PCT Filed: Sep. 18, 2020

(86) PCT No.: PCT/JP2020/035609
§ 371 (c)(1),
(2) Date: Mar. 16, 2022

(87) PCT Pub. No.: WO2021/054472
PCT Pub. Date: Mar. 25, 2021

(65) Prior Publication Data
US 2022/0344985 A1 Oct. 27, 2022

(30) Foreign Application Priority Data
Sep. 20, 2019 (JP) .................................. 2019171621

(51) Int. Cl.
*H02K 1/27* (2022.01)
*H02K 1/17* (2006.01)

(52) U.S. Cl.
CPC ................ *H02K 1/17* (2013.01); *H02K 1/27* (2013.01)

(58) Field of Classification Search
CPC ......... H02K 1/27; H02K 1/276; H02K 1/2783
See application file for complete search history.

(56) References Cited

U.S. PATENT DOCUMENTS 9,735,631 B2 * 8/2017 Kayano ............... H02K 1/2766
2002/0180294 A1 12/2002 Kaneda et al.
(Continued)

FOREIGN PATENT DOCUMENTS

EP 2372886 A1 10/2011
JP 2002354721 A 12/2002
(Continued)

OTHER PUBLICATIONS

JP 2011147346 A (Year: 2011).*
International Search Report in PCT/JP2020/035609, mailed Dec. 2, 2020, 2 pages.

*Primary Examiner* — Daniel C Puentes
*Assistant Examiner* — Masoud Vaziri
(74) *Attorney, Agent, or Firm* — Kilpatrick Townsend & Stockton LLP

(57) ABSTRACT

A field magnet holder provided at a field portion of an electric motor is formed of a non-magnetic material. An inner wall and outer wall of the field magnet holder are respectively formed in annular shapes. Plural spacers are arranged between the inner wall and outer wall at a predetermined spacing in the circumferential direction. Sockets into which permanent magnets are inserted are formed between the spacers of the field magnet holder, plurally in the circumferential direction. Therefore, the permanent magnets may be easily assembled by being respectively inserted into the sockets. The plural permanent magnets are arrayed with magnetization directions thereof successively changed in steps of an angle that is a full cycle of electrical angles divided by a division number n, which division number n is any one integer that is at least three. Thus, ease of assembly of the permanent magnets is improved.

5 Claims, 9 Drawing Sheets

(56) References Cited

U.S. PATENT DOCUMENTS

| | | | | |
|---|---|---|---|---|
| 2002/0180295 A1* | 12/2002 | Kaneda | ............... | H02K 1/2783 |
| | | | | 310/156.43 |
| 2003/0094873 A1* | 5/2003 | Kim | ................... | H02K 1/2783 |
| | | | | 310/156.43 |
| 2013/0062990 A1* | 3/2013 | Takeuchi | ................. | B62M 6/40 |
| | | | | 310/216.004 |
| 2015/0357870 A1* | 12/2015 | Hazeyama | .......... | H02K 1/2766 |
| | | | | 310/156.07 |
| 2018/0316234 A1* | 11/2018 | Ikawa | .................... | H02K 29/03 |

FOREIGN PATENT DOCUMENTS

| | | | | |
|---|---|---|---|---|
| JP | 2009201343 A | * | 9/2009 |
| JP | 2010154688 A | | 7/2010 |
| JP | 2011147346 A | * | 7/2011 |

* cited by examiner

MAGNETIC FIELD GENERATING DEVICE AND ROTATING ELECTRICAL MACHINE

TECHNICAL FIELD

The disclosed technology relates to a magnetic field generating device and a rotating electrical machine.

BACKGROUND ART

A field system in which north and south poles of permanent magnets are alternatingly arrayed (an N-S array field system) is used in an electric motor, a generator or the like. A magnetic field at one side (a radial direction inner side or outer side) of the arrayed permanent magnets of this field system is used but, in an N-S array field system, the magnetic field is generated at both sides of the arrayed permanent magnets. Thus, the magnetic field (magnetic energy from the permanent magnets) is not utilized effectively.

Permanent magnet array field systems include a Halbach array field system, in which plural permanent magnets are arrayed with the directions of the magnetic poles (magnetization directions) being successively turned in steps of, for example, 90°. In a Halbach array field system, a magnetic field may be produced that is stronger at one side than the other side of the arrayed permanent magnets. Thus, the magnetic field generated by the permanent magnets may be utilized effectively.

Japanese Patent Application Laid-Open (JP-A) Nos. 2009-201343 and 2010-154688, etc. disclose field systems (dual Halbach array field systems) in which two Halbach magnet arrays are disposed to oppose one another such that the magnetic fields mutually reinforce one another and the magnetic fields generated by the permanent magnets may be more effectively utilized.

SUMMARY OF INVENTION

Technical Problem

In a Halbach array field system to be used in an electric motor, numerous permanent magnets are arrayed in a circumferential direction so as to touch one another (without gaps). Angles between the magnetization directions of permanent magnets that are adjacent to one another are not 0° (magnetization directions in the same direction) or 180° (magnetization directions in opposite directions) but angles depending on a division number (for example, 90°, 72°, 45° or the like). Therefore, in the Halbach array field system, strong repulsion forces and attachment forces are produced in unexpected directions between permanent magnets that are adjacent to one another. Accordingly, time and skill are necessary for assembly of the permanent magnets; an improvement in ease of working is called for.

The present disclosure is made in consideration of the circumstances described above. An object of the present disclosure is to provide a magnetic field generating device and a rotating electrical machine that may improve ease of assembly work.

Solution to Problem

In order to achieve the object described above, a magnetic field generating device according to a first aspect includes: a field portion including plural permanent magnets arranged in a circumferential direction, with magnetization directions thereof being successively changed in steps of an angle that is a full cycle of electrical angles divided by a division number n, the division number n being any one integer that is at least three; and a retaining member in which a non-magnetic material is used, the retaining member including an annular outer periphery wall, respective outer periphery faces of the permanent magnets abutting against an inner periphery face of the outer periphery wall and, in the circumferential direction of the outer periphery wall, plural dividing walls that respectively project to the inner side in the radial direction from the inner face of the outer periphery wall, the permanent magnets being respectively inserted between mutually adjacent the dividing walls.

In the magnetic field generating device according to the first aspect, the division number n is any integer that is at least three. The plural permanent magnets are arrayed in the circumferential direction to form the field portion, with the magnetization directions thereof being changed one-by-one in steps of the angle that is a full cycle of electrical angles divided by the division number n. In the field portion, the retaining member is provided, which uses a non-magnetic body or a non-magnetic material such as a synthetic resin or the like. The plural permanent magnets are respectively retained in the field portion by the retaining member.

The respective outer periphery faces of the plural permanent magnets abut against the inner periphery face of the outer periphery wall with the annular shape. The retaining member includes the plural dividing walls in the circumferential direction of the outer periphery wall. Each dividing wall protrudes to the inner side in the radial direction from the inner face of the outer periphery wall. The permanent magnets are respectively inserted between the mutually adjacent dividing walls. Thus, the permanent magnets are retained in the retaining member and assembled to the field portion by being inserted and disposed between the dividing walls, which are set apart in the circumferential direction. Therefore, ease of assembly of the permanent magnets to the field portion may be improved.

In a magnetic field generating device according to a second aspect, in the first aspect, the retaining member includes an inner periphery wall, respective inner periphery faces of the permanent magnets abutting against an outer periphery face of the inner periphery wall, and respective radial direction inner side ends of the dividing walls being connected to the outer periphery face.

In the magnetic field generating device according to the second aspect, the inner periphery wall is provided at the retaining member, and the permanent magnets are respectively disposed between the inner periphery wall and the outer periphery wall. Therefore, assembly of the permanent magnets to the retaining member may be made easier, ease of assembly of the field portion may be further improved, and productivity of the field portion may be improved.

In a magnetic field generating device according to a third aspect, in the first aspect or the second aspect, a thickness dimension d of the dividing walls is specified in accordance with the division number n and with a length dimension lm of one side of each of the permanent magnets in an arrangement direction, in a section cut along the magnetization directions of the permanent magnets, the length dimension lm being specified as a reference in advance. Permanent magnets arranged in a linear shape are applied as permanent magnets for the reference of the length direction lm.

In a magnetic field generating device according to a fourth aspect, in the third aspect, the thickness dimension d of the dividing walls satisfies the relationship $0 < d \le 1 \, m \times 1/(n+1) \times 1.5$. In a magnetic field generating device according to a fifth aspect, in the third aspect or the fourth aspect, the thickness dimension d of the dividing walls satisfies the relationship d=1 m/(n+1).

A magnetic field generating device according to a sixth aspect, in any one of the first to fifth aspects may include: a ferromagnetic body formed in an annular shape opposing each of the permanent magnets of the field portion, the ferromagnetic body being provided to be relatively rotatable with respect to the field portion, and the ferromagnetic body forming a magnetic field between the field portion and the ferromagnetic body in accordance with magnetism of the field portion.

In the magnetic field generating device according to the sixth aspect, the ferromagnetic body is arranged to be relatively rotatable with respect to the field portion. Therefore, an effective magnetic field may be formed between the permanent magnets of the field portion and the ferromagnetic body.

In a magnetic field generating device according to a seventh aspect, in any one of the first to fifth aspects: the field portion includes a first field portion and a second field portion disposed at the radial direction outer side of the first field portion, the plural permanent magnets being arranged in the circumferential direction at the first field portion, the plural permanent magnets being arranged in the circumferential direction at the second field portion, and the second field portion being rotatable integrally with the first field portion; and the retaining member includes a first retaining member that retains each of the permanent magnets of the first field portion and a second retaining member that retains each of the permanent magnets of the second field portion.

In the magnetic field generating device according to the seventh aspect, the first field portion and the second field portion are provided as a pair. The first field portion and second field portion are equipped with, respectively, the first retaining member and the second retaining member. Thus, when the first field portion and second field portion are arranged as the pair, assembly of the respective permanent magnets to the first field portion and the second field portion may be easier and productivity may be improved.

A rotating electrical machine according to an eighth aspect includes: a field portion including plural permanent magnets arranged in a circumferential direction, with magnetization directions thereof being successively changed in steps of an angle that is a full cycle of electrical angles divided by a division number n, the division number n being any one integer that is at least three; a retaining member in which a non-magnetic material is used, the retaining member including: an annular outer periphery wall, respective outer periphery faces of the permanent magnets abutting against an inner periphery face of the outer periphery wall and, in the circumferential direction of the outer periphery wall, plural dividing walls that respectively project to the inner side in the radial direction from the inner face of the outer periphery wall, the permanent magnets being respectively inserted between mutually adjacent the dividing walls; and an armature disposed to be relatively rotatable with respect to the field portion at which the respective permanent magnets are retained in the retaining member.

In the rotating electrical machine according to the eighth aspect, the field portion and the armature are relatively rotated. In the field portion, the division number n is any integer that is at least three, and the plural permanent magnets are arrayed in the circumferential direction with the magnetization directions thereof being changed one-by-one in steps of the angle that is a full cycle of electrical angles divided by the division number n. The retaining member is provided at the field portion, and the plural permanent magnets are respectively retained by the retaining member.

A non-magnetic material is used for this retaining member. The respective outer periphery faces of the plural permanent magnets abut against the inner periphery face of the outer periphery wall with the annular shape. The retaining member includes the plural dividing walls in the circumferential direction of the outer periphery wall. Each dividing wall protrudes to the inner side in the radial direction from the inner periphery face of the outer periphery wall. The permanent magnets are respectively inserted between the mutually adjacent dividing walls. Therefore, the permanent magnets may be assembled to the field portion by being inserted and disposed between the dividing walls, which are set apart in the circumferential direction, assembly of the permanent magnets to the field portion may be made easier, and ease of assembly of the field portion may be improved.

A rotating electrical machine according to a ninth aspect, in the eighth aspect includes: a ferromagnetic body formed in an annular shape opposing each of the permanent magnets of the field portion, the ferromagnetic body being provided to be relatively rotatable with respect to the field portion, and three-phase coils of the armature being arranged in the circumferential direction at a face of the ferromagnetic body at the side thereof at which the field portion is disposed.

In a rotating electrical machine according to a tenth aspect, in the eighth aspect: the field portion includes a first field portion and a second field portion disposed at the radial direction outer side of the first field portion, the plural permanent magnets being arranged in the circumferential direction at the first field portion, the plural permanent magnets being arranged in the circumferential direction at the second field portion, and the second field portion being rotatable integrally with the first field portion; the retaining member includes a first retaining member that retains each of the permanent magnets of the first field portion and a second retaining member that retains each of the permanent magnets of the second field portion; and three-phase coils of the armature are arranged in the circumferential direction between the first field portion and the second field portion.

In a rotating electrical machine according to an eleventh aspect, in any one of the eighth to tenth aspects, the retaining member includes an inner periphery wall, respective inner periphery faces of the permanent magnets abutting against an outer periphery face of the inner periphery wall, and respective radial direction inner side ends of the dividing walls being connected to the outer periphery face.

In a rotating electrical machine according to a twelfth aspect, in any one of the eighth to eleventh aspects, a thickness dimension d of the dividing walls is specified in accordance with the division number n and with a length dimension lm of one side of each of the permanent magnets in an arrangement direction, in a section cut along the magnetization directions of the permanent magnets, the length dimension lm being specified as a reference in advance. Permanent magnets arranged in a linear shape are applied as permanent magnets for the reference of the length direction lm.

In the twelfth aspect citing the ninth aspect, the length dimension lm in the rotating electrical machine according to the present aspect satisfies a relationship Lf=lm×n'P, in which Lf represents a circumferential direction length dimension of the ferromagnetic body at the side thereof at which the field portion is disposed, and P represents a magnetic pole number of the field portion.

In the twelfth aspect citing the tenth aspect, the length dimension lm in the rotating electrical machine according to the present aspect satisfies a relationship Lg=lm×n×P, in which Lg represents a circumferential direction length dimension at a gap center Gc between the first field portion and the second field portion, and P represents a magnetic pole number of the field portion.

In a rotating electrical machine according to a thirteenth aspect, in the twelfth aspect, the thickness dimension d of the dividing walls satisfies the relationship 0<d ≤lm×1/(n+1)× 1.5. In a rotating electrical machine according to a fourteenth aspect, in the twelfth aspect or the thirteenth aspect, the thickness dimension d of the dividing walls satisfies the relationship d=lm/(n+1).

Advantageous Effects of Invention

According to the magnetic field generating device and rotating electrical machine of the present disclosure as described above, for a field portion in which plural permanent magnets are arrayed in a circumferential direction with the magnetization directions thereof being successively changed in steps of an angle that is a full cycle of electrical angles divided by a division number n and the division number n being any integer that is at least three, effects are provided in that assembly of the plural permanent magnets may be made easier and equipment productivity may be improved.

DETAILED DESCRIPTION

Herebelow, an exemplary embodiment of the present disclosure is described in detail with reference to the attached drawings.

Figure 1:
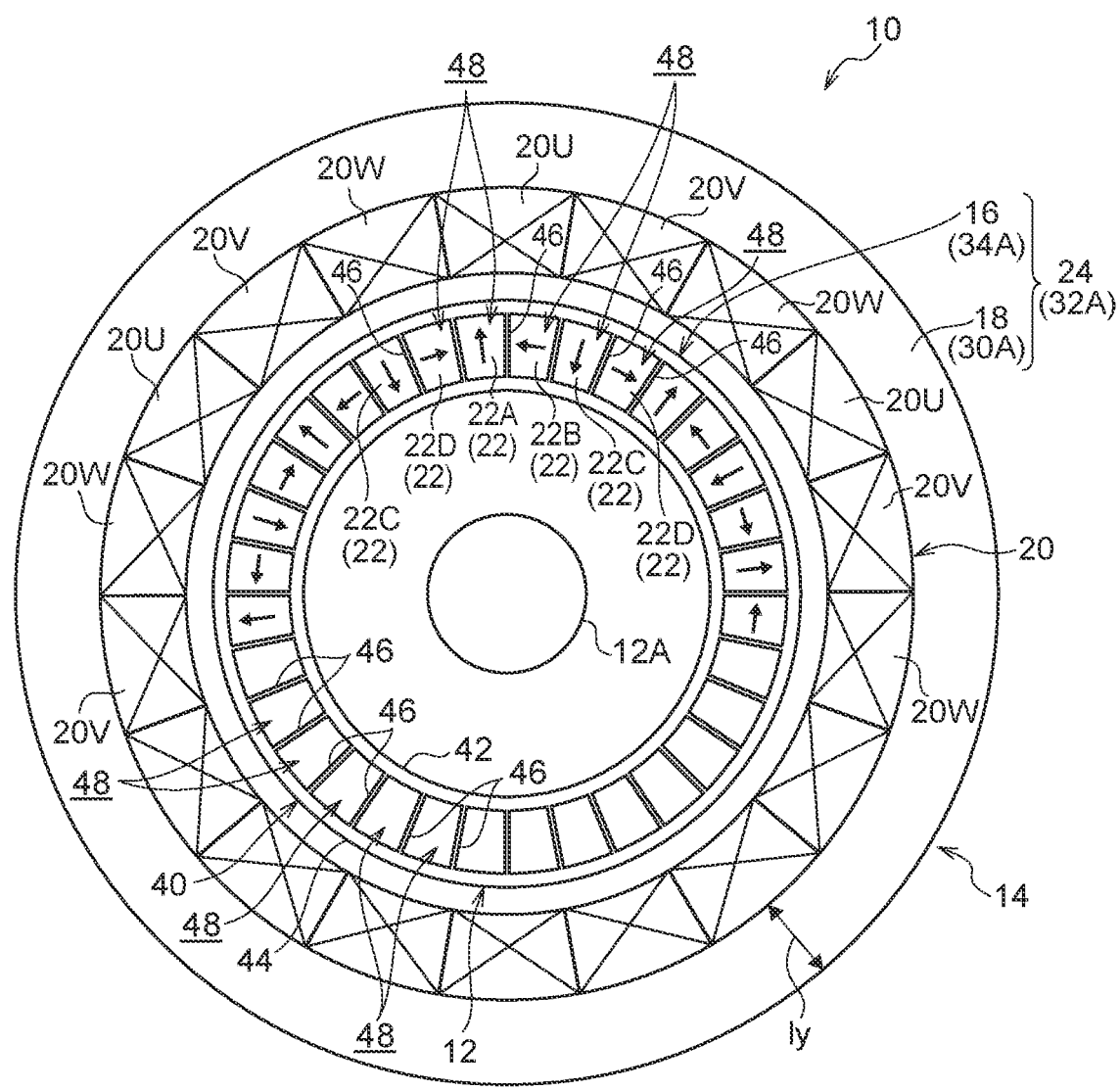
FIG. 1 is a schematic diagram showing principal portions of an electric motor according to a present exemplary embodiment.

FIG. 1 shows, in a plan view seen in an axial direction, schematic structures of principal portions of a three-phase AC electric motor (below referred to as "the electric motor") 10 that serves as a rotating electrical machine according to the present exemplary embodiment.

As shown in FIG. 1, the electric motor 10 is provided with a rotor 12 with a substantially cylindrical outer profile that serves as a rotor, and a stator 14 with a substantially annular shape (which may be a substantially cylindrical shape) that serves as a stator. In the electric motor 10, the central axis of the rotor 12 and the central axis of the stator 14 coincide, and the rotor 12 is relatively rotatably accommodated inside the stator 14.

A field portion 16 in an annular shape (which may be a cylindrical shape) is provided at an outer periphery portion of the rotor 12. An outer cylinder portion 18 in an annular shape (which may be a cylindrical shape) and an armature 20 are provided at the stator 14. The outer cylinder portion 18 serves as a ferromagnetic body. The armature 20 is arranged in the circumferential direction at an inner periphery face of the outer cylinder portion 18. Thus, in the electric motor 10, the armature 20 opposes the radial direction outer side of the field portion 16 of the rotor 12, the armature 20 is integral, and the armature 20 is relatively rotatable with respect to the field portion 16.

In the electric motor 10, a plural number of permanent magnets 22 are arranged in the circumferential direction at an outer periphery portion of the field portion 16. A magnetic field generating portion 24 of the electric motor 10, which serves as a magnetic field generating device, is constituted by the field portion 16 of the rotor 12 and the outer cylinder portion 18 of the stator 14. The magnetic field generating portion 24 forms a magnetic field (magnetic field) between the field portion 16 and the outer cylinder portion 18.

As plural coils in the armature 20 of the electric motor 10, U-phase coils 20U, V-phase coils 20V and W-phase coils 20W are provided. The coils 20U, 20V and 20W (coils 20U to 20W) respectively employ Litz wire as windings. The coils 20U to 20W are respectively air-core coils, and the coils 20U to 20W are respectively formed as concentrated windings.

In the armature 20, the coil 20U, coil 20V and coil 20W of the three phases form a set. Plural sets of the coils 20U to 20W are arranged in a predetermined sequence along the circumferential direction at the inner periphery face of the outer cylinder portion 18. As an example in the electric motor 10, six sets of the coils 20U to 20W are used and a slot number S of the electric motor 10 is 18. Each of the six sets of the coils 20U to 20W in the electric motor 10 is connected in series and is arrayed in, for example, a sequence of coils 20U, 20V, 20W, 20U, 20V, 20W, etc. in the circumferential direction of the outer cylinder portion 18. The coils 20U to 20W and coils 20U', 20V' and 20W', which are reverse windings of the coils 20U to 20W, may be used in the electric motor 10. In this case, each set is arrayed in a sequence of coils 20U', 20U, 20U', 20V', 20V, 20V', 20W', 20W, 20W', 20U', 20U, etc. in the circumferential direction of the outer cylinder portion 18.

AC electric power with a predetermined frequency is supplied to each of the coils 20U, 20V and 20W of the electric motor 10 in three phases (the U phase, the V phase and the W phase), which are offset by 120° from one another in the range of a full cycle of electrical angles. As a result, the rotor 12 of the electric motor 10 is rotated at a rotary speed according to the frequency of the three-phase AC electric power being supplied to the armature 20 (to each of the plural sets of the coils 20U to 20W), and the power output shaft 12A is driven to rotate integrally with the rotor 12.

Now, the field portion 16 of the rotor 12 and the outer cylinder portion 18 of the stator 14 that form the magnetic field generating portion 24 of the electric motor 10 are described.

Figure 2:
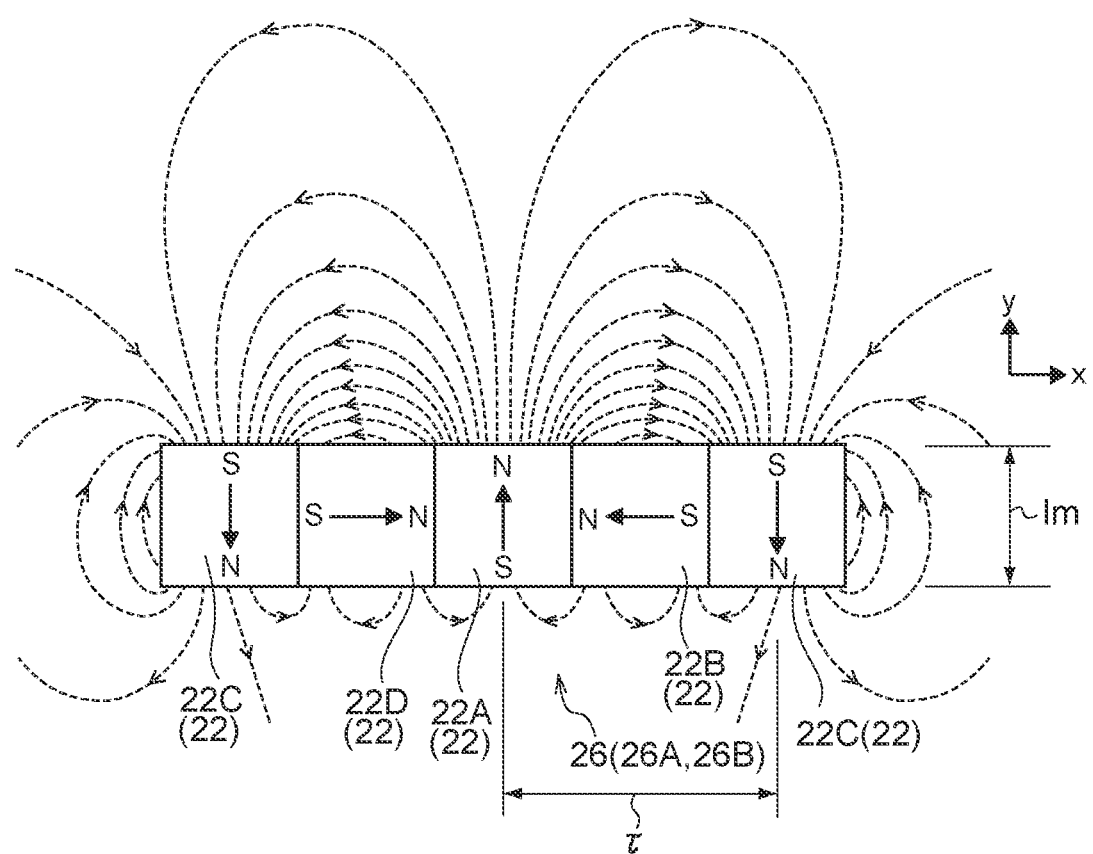
FIG. 2 is a schematic diagram showing a Halbach magnet array.
Figure 3A:
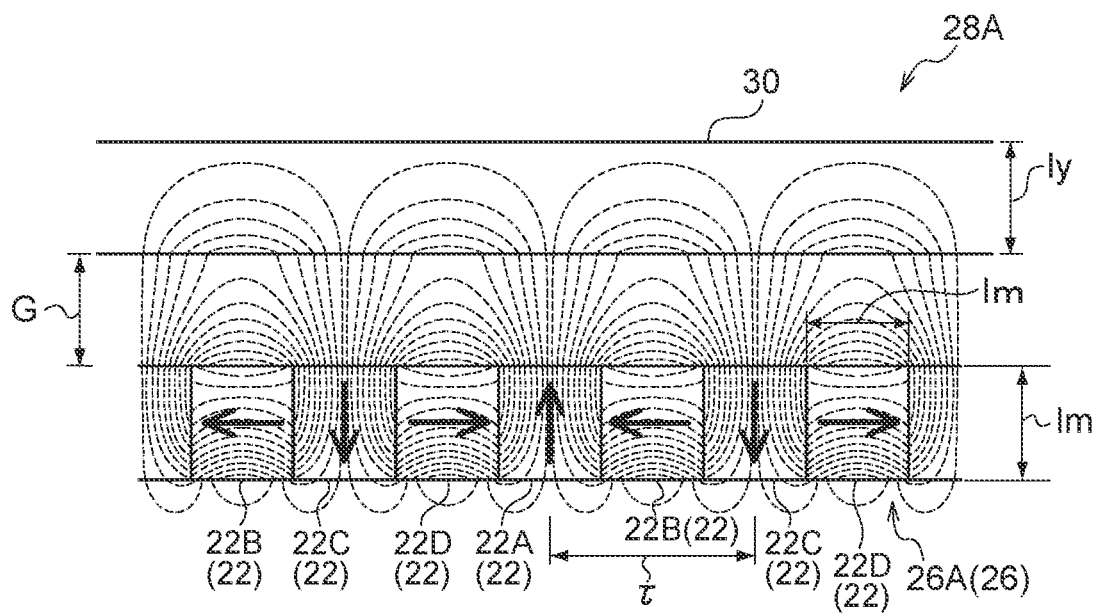
FIG. 3A is a schematic structural diagram showing a magnetic field generating portion in which a ferromagnetic body replaces one Halbach magnet array of a magnetic field generating portion in which two Halbach magnet arrays are opposed.
Figure 3B:
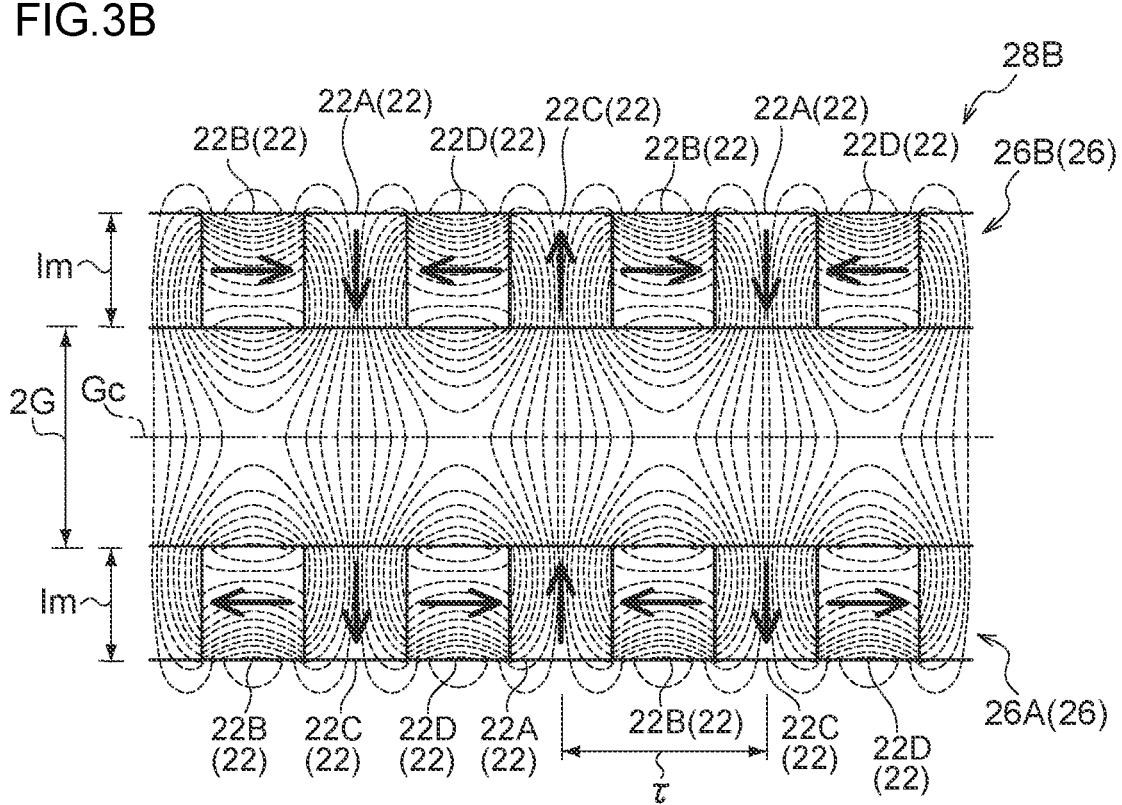
FIG. 3B is a schematic structural diagram showing the magnetic field generating portion in which the two Halbach magnet arrays are opposed.

A Halbach magnet array is employed at the field portion 16 of the magnetic field generating portion 24. FIG. 2 shows a schematic of a single Halbach array field system (below referred to simply as "the Halbach array field system 26") employing a Halbach magnet array in a plan view. FIG. 3A and FIG. 3B show schematics of magnetic field generating portions 28A and 28B in which respective Halbach magnet arrays are employed in plan views.

In the drawings, the north pole side of each permanent magnet 22 is indicated by the symbol N and the south pole side is indicated by the symbol S. In the descriptions below, the magnetization direction of each permanent magnet 22 is indicated by an arrow (a solid line arrow) from the south pole side toward the north pole side. Magnetic force lines are indicated by broken line arrows from the north pole side toward the south pole side (and from the south pole side toward the north pole side inside the permanent magnets 22). In the drawings, one direction, indicated by an arrow x, is an arrangement direction of the permanent magnets 22, and a direction of magnetic force lines that contribute to generating torque at the Halbach magnet array is indicated by an arrow y.

As illustrated in FIG. 2, the permanent magnets 22 are used in a Halbach magnet array. A cross section of each permanent magnet 22 cut along the magnetization direction thereof is formed in a substantially rectangular shape (a substantially square shape, and in three dimensions, a substantially cuboid shape). A division number n and an angle θ (not shown in the drawings) according to the division number n are specified for the Halbach magnet array. Depending on the division number n, N of the permanent magnets 22 are successively arranged in a predetermined direction (the direction of arrow x) with the magnetization directions thereof being changed in steps of the predetermined angle θ. Thus, a single Halbach array field system 26 (below referred to simply as "the Halbach array field system 26") is formed. The angle θ is the angle (not shown in the drawings) between the magnetization directions of two adjacent permanent magnets 22.

The division number n that is employed in the Halbach magnet array is an integer that is at least three, and the angle θ that is employed is an angle obtained by dividing a full cycle of electrical angles ($2\pi$ radians=360° by the division number n (the integer that is at least three). In the Halbach array field system 26, as an example, the division number n=4 and the angle θ=90° (θ=360°/4=90°).

In this Halbach array field system 26, permanent magnets 22A, 22B, 22C and 22D are successively arrayed with the magnetization directions thereof being changed in steps of 90° (and this arrangement of the permanent magnets 22A to 22D is repeated). The magnetization directions of the permanent magnets 22B and 22D at the two sides of each permanent magnet 22A are oriented towards the permanent magnet 22A. As a result, a magnetic field of the Halbach array field system 26 is stronger at one side in a direction crossing the array direction (the side in the magnetization direction of the permanent magnets 22A), and the strength of the magnetic field at the other side (the opposite side from the magnetization direction of the permanent magnets 22A) is suppressed.

As shown in FIG. 3B, the magnetic field generating portion 28B is formed as a dual Halbach array field system in which a pair of the Halbach array field system 26 (26A and 26B) are arranged. In the magnetic field generating portion 28B, the set of two Halbach array field systems 26A and 26B oppose one another, spaced apart by a predetermined spacing (a gap length 2G).

More specifically, the magnetic field generating portion 28B is formed by the two Halbach array field systems 26A and 26B being formed with the sides thereof at which the magnetic fields are stronger opposing one another. Here, the permanent magnets 22A of one of the Halbach array field systems 26A and 26B in the magnetic field generating portion 28B (for example, the Halbach array field system 26A) are opposed with the permanent magnets 22C of the other (for example, the Halbach array field system 26B), which have the same magnetization direction.

Namely, the Halbach array field system 26A and 26B could be described as a state in which the permanent magnet 22B and permanent magnet 22D at the two sides of each permanent magnet 22A are switched, in a state in which the magnetization directions of the permanent magnets 22A were the same as one another (and the permanent magnets 22C could be the same as one another). Thus, in the magnetic field generating portion 28B, a magnetic field is formed between the Halbach array field systems 26A and 26B arranged in a pair, which magnetic field is stronger than in a structure using only one of the Halbach array field system 26.

In relation to electric fields (in the field of electrostatics), the method of images (method of mirror charges) is known. Although not shown in the drawings, according to the method of images, electric force lines between positive and negative point charges of +q and −q that are opposed with a predetermined distance (spacing dimension) 2g therebetween have planar symmetry (in two dimensions, line symmetry). The plane of symmetry is at a position at distances g from the point charges +q and −q, which is a central position therebetween. From this situation, one of the point charges +q and −q (for example, the point charge −q) is replaced with a conductive body (a perfect conductor). A surface at the point charge +q side of the conductive body is disposed at the position the distance g from the point charge +q (i.e., the central position between the point charges +q and −q). Hence, according to the method of images, electric force lines between the point charge +q and the conductive body are the same as the electric force lines between the point charge +q and the central position (the position of the plane of symmetry) between the point charges +q and −q.

The method of images is similarly applicable to magnetic fields (magnetic fields), with a ferromagnetic material (a ferromagnetic body) being employed in place of the conductive body. Accordingly, in the magnetic field generating portion 28A as shown in FIG. 3A, a ferromagnetic body 30 using a ferromagnetic material is disposed in place of the Halbach array field system 26B of the magnetic field generating portion 28B. A surface of the ferromagnetic body 30 at the side thereof at which the Halbach array field system 26A is disposed is disposed at the position of a gap center Gc, which is a central position between the Halbach array field systems 26A and 26B of the magnetic field generating portion 28B.

Therefore, in the magnetic field generating portion 28A, the spacing dimension between the Halbach array field system 26A and the ferromagnetic body 30 is a gap length G, in contrast to the gap length 2G that is the spacing between the Halbach array field systems 26A and 26B in the magnetic field generating portion 28B. Hence, a magnetic flux distribution between the Halbach array field system 26A and the ferromagnetic body 30 in the magnetic field generating portion 28A is the same as a magnetic flux distribution between the gap center Gc and the Halbach array field system 26A in the magnetic field generating portion 28A (dual Halbach array field system). In the electric motor 10 and magnetic field generating portion 24 according to the present exemplary embodiment, arrays of the permanent magnets 22 in the magnetic field generating portions 28A and 28B serve as references.

Effects the same as effects provided by the dual Halbach magnet array are obtained by deforming each of the permanent magnets 22 in a dual Halbach magnet array so as to satisfy predetermined conditions and forming the magnetic field generating portions 28A and 28B into annular shapes As shown in FIG. 1, in the magnetic field generating portion 24 of the electric motor 10, the field portion 16 is formed of a Halbach magnet array in which k sets (a set number k) of the permanent magnets 22A to 22D are used, and the permanent magnets 22A to 22D are successively arranged in the circumferential direction. As an example in the electric motor 10, the set number k of the permanent magnets 22A to 22D used in the field portion 16 is 8 (8 sets; k=8).

Figure 4A:
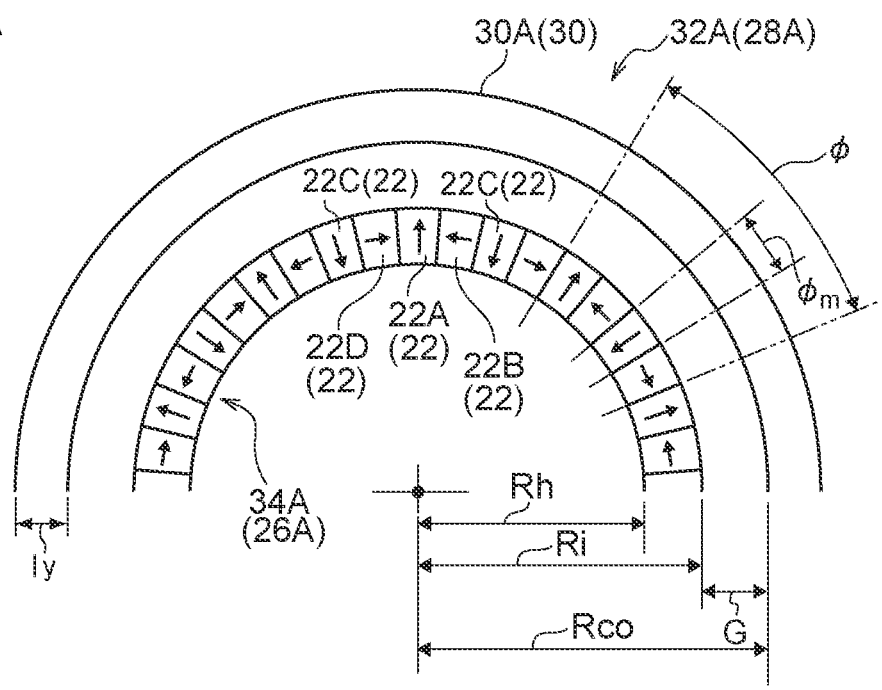
FIG. 4A is a schematic structural diagram showing a magnetic field generating portion that is deformed from FIG. 3A.
Figure 4B:
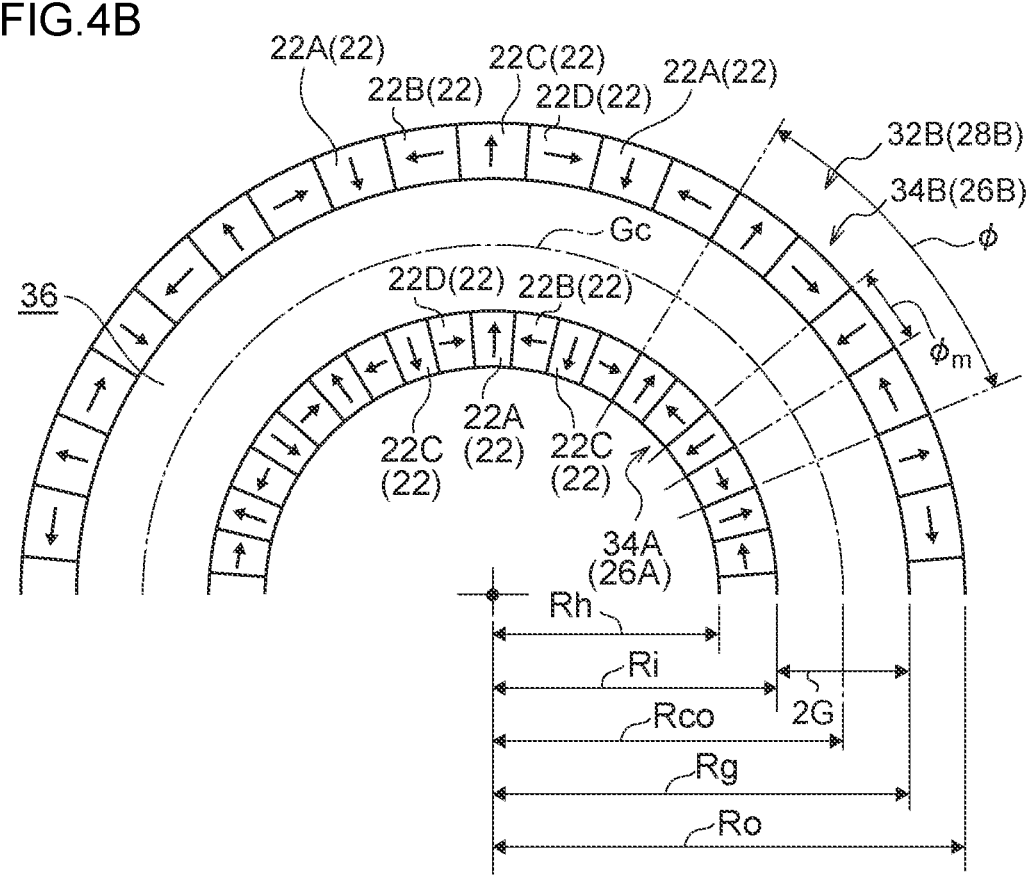
FIG. 4B is a schematic structural diagram showing a magnetic field generating portion that is deformed from FIG. 3B.

FIG. 4A and FIG. 4B each show a magnetic field generating portion in which the permanent magnets 22 (and magnetic field) are arrayed in an annular shape in a plan view seen in the axial direction. FIG. 4A shows a magnetic field generating portion 32A corresponding to the magnetic field generating portion 28A in which one Halbach magnet array is used, and FIG. 4B shows a magnetic field generating portion 32B corresponding to the magnetic field generating portion 28B in which two Halbach magnet arrays are used (a dual Halbach magnet array). Below, for simplicity of description, reference symbols the same as for the undeformed permanent magnets 22 are assigned to the deformed permanent magnets.

In a Halbach magnet array, n of the permanent magnets 22 are formed in sets according to the division number n. In the Halbach magnet array, in the array of the N permanent magnets 22 corresponds to dipoles of north and south, and the magnetic pole number P corresponds to the dipoles. Therefore, in the electric motor 10, a total number M of the permanent magnets 22 over the circumference is 32 (M=n× k=32), 32 of the permanent magnets 22 are used in the eight sets of the permanent magnets 22A to 22D in the field portion 16, and the magnetic pole number P of the electric motor 10 is 16.

As shown in FIG. 2, FIG. 3A and FIG. 3B, a pole pitch $\tau$ of the Halbach array field system 26 (26A or 26B) is a length in the array direction of a range in which the magnetization direction reverses (a range in which the magnetization direction changes by) 180°). In a state in which the permanent magnets 22 are arrayed and are closely contacted, given the division number n and a length (a length dimension) lm of one side of each permanent magnet 22 in the array direction, the pole pitch $\tau$ is $\tau=(n\times lm)/2$. In the magnetic field generating portion 28B, a gap length 2G that provides a maximum number of magnetic flux nodes at the gap center Gc is in a range from 0.5 times to 2.0 times the pole pitch $\tau$ ($0.5\tau<2G<2.0\tau$). The length dimension lm of the permanent magnets 22 is a length dimension that is specified as a reference in advance. The length dimension lm of the permanent magnets 22 that is applied is the length of each permanent magnet 22 at the side of the armature 20 at which the permanent magnets 22 of the Halbach array field system 26 (26A or 26B) form the magnetic field.

Accordingly, a gap length G in the magnetic field generating portion 28A, which is a spacing between an outer periphery face of the Halbach array field system 26A (the outer periphery faces of the permanent magnets 22) and a surface of the ferromagnetic body 30, is set in a range from 0.25 times to 1.0 times the pole pitch $\tau$ (0.25 $\tau\le G\le 1.0\,\tau$). In relation to the division number n, the gap length G falls in a range from $(0.25\times n\times lm\times 1/2)$ times to $(1.0\times n\times lm\times 1/2)$ times the length dimension lm of the permanent magnets 22 (that is, $(0.125\times lm)\le G\le(0.5\times n\times lm)$). Thus, when the division number n=4, the gap length G falls within a range from 0.5 to 2.0 times the length dimension lm of the permanent magnets 22 $((0.5\times lm)\le G\le(2.0\times lm))$.

When k sets of the permanent magnets 22 with the division number n are arrayed in each of the Halbach array field systems 26A and 26B of the magnetic field generating portion 28B, a length dimension of the gap center Gc in the array direction is $k\times n\times lm=2\times k\times\tau$.

In the magnetic field generating portion 32B shown in FIG. 4B, the Halbach array field systems 26A and 26B of the magnetic field generating portion 28B are deformed so as to satisfy predetermined conditions. Thus, Halbach array field systems 34A and 34B are formed. In the magnetic field generating portion 32B, the gap center Gc serves as a reference circle, and the Halbach array field systems 34A and 34B are arranged to sandwich the gap center Gc. The Halbach array field systems 34A and 34B of the magnetic field generating portion 32B sandwich a gap 36 and oppose one another. In the Halbach array field systems 34A and 34B, each of the permanent magnets 22 of the Halbach array field systems 26A and 26B serves as a reference and is deformed into a handfan-like annular shape (a partial annular shape), and the permanent magnets 22 are arrayed in the circumferential direction to form the Halbach array field systems 34A and 34B.

The length (circumference) of the gap center Gc is the same in the magnetic field generating portion 32B and the magnetic field generating portion 28B. In the magnetic field generating portion 32B, the spacing (gap length) between the Halbach array field systems 34A and 34B is the same as the gap length 2G in the magnetic field generating portion 28B, and spacings between each of the Halbach array field systems 34A and 34B and the gap center Gc are the gap length G.

Of cross-sectional areas in a radial direction section of the magnetic field generating portion 32B, a ratio of a cross-sectional area in the gap 36 between the gap center Gc and the Halbach array field system 34A to a cross-sectional area between the gap center Gc and the Halbach array field system 34B is set to be the same as a ratio of a cross-sectional area of the Halbach array field system 34A to a cross-sectional area of the Halbach array field system 34B.

That is, in the radial direction section of the magnetic field generating portion 32B, if the cross-sectional area between the gap center Gc and the Halbach array field system 34B is represented by S1, the cross-sectional area between the gap center Gc and the Halbach array field system 34A is represented by S2, the cross-sectional area of the Halbach array field system 34B is represented by S3, and the cross-sectional area of the Halbach array field system 34A is represented by S4, the magnetic field generating portion 32B satisfies the relationship S2:S1=S4:S3 (i.e., S1/S2=S3/S4).

In the radial direction cross section of the magnetic field generating portion 32B, in a range of a predetermined angle φ (°) (for example, the range of one set of the permanent magnets 22A to 22D, which is the range depicted with a two-dot chain line in FIG. 4B), the cross-sectional area between the gap center Gc and the Halbach array field system 34B in this range is an area Sgo, the cross-sectional area between the gap center Gc and the Halbach array field system 34A is an area Sgi, the cross-sectional area of the Halbach array field system 34B is an area Smo, and the cross-sectional area of the Halbach array field system 34A is an area Smi. The magnetic field generating portion 32B satisfies the relationship Sgi:Sgo=Smi:Smo (i.e., Smi/Smo=Sgi/Sgo; Smo/Smi=Sgo/Sgi is also satisfied).

In the magnetic field generating portion 32B that is formed thus, the inner radius of the Halbach array field system 34A, the outer radius of the Halbach array field system 34A (the inner radius of the gap 36), the radius of the gap center Gc, the inner radius of the Halbach array field system 34B (the outer radius of the gap 36), and the outer radius of the Halbach array field system 34B are represented by, respectively, Rh, Ri, Rco, Rg and Ro. These feature relationships such as Ri=Rco−G and Rg=Rco+G.

The areas Sgo, Sgi, Smo and Smi, respectively, are represented by, for example, the following expressions.

$$Sgo=(Rg^2-Rco^2)\times\pi\times\varphi/360$$

$$Sgi=(Rco^2-Ri^2)\times\pi\times\varphi/360$$

$$Smo=(Ro^2-Rg^2)\times\pi\times\varphi/360$$

$$Smi=(Ri^2-Rh^2)\times\pi\times\varphi/360$$

In the Halbach array field systems 34A and 34B, cross sections along the magnetization directions of the permanent magnets 22 are in handfan-like annular shapes (partial annular shapes) that are similar to substantially rectangular shapes (and substantially square shapes), similar to the Halbach array field systems 26A and 26B. In the magnetic field generating portion 32B, the respective permanent magnets 22 serving as the reference are deformed and arrayed so as to satisfy the conditions above. Thus, the magnetic field generating portion 32B provides the effects of a dual Halbach magnet array similarly to the magnetic field generating portion 28B.

In accordance with the method of deformation described above, the length dimension lm of each permanent magnet 22 in the array direction is represented as follows, depending on the kinds (combination) of field system (the field portion 16) and armature (the armature 20).

In the magnetic field generating portion 28B employing a dual Halbach magnet array, if the permanent magnets 22 are in close proximity with one another, a length dimension at the gap center Gc corresponding to one set of the permanent magnets 22 is 2×τ=n×lm. In the magnetic field generating portions 28A and 28B, the length dimension lm of the permanent magnets 22 is represented by lm=2×τ×1(τ=n×lm/2). This length dimension lm of the permanent magnets 22 is the same as the length dimension of the permanent magnets 22 of the Halbach array field systems 26A and 26B (the undeformed permanent magnets 22).

In the magnetic field generating portion 32B employing a dual Halbach magnet array, a length dimension Lc in the circumferential direction of the gap center Gc in the range of one set of the permanent magnets 22 (the range of the angle φ) is Lc=2×π/360. If the pole pitch at the gap center Gc is again represented by i, Lc=2×τ, and if a dimension corresponding to the length of each permanent magnet 22 in the array direction at the gap center Gc is the length dimension lm, Lc=n×lm. Therefore, in the magnetic field generating portion 32B, the length dimension lm at the gap center Gc corresponds to lm=Lc/n. If the length dimension of the whole circumference at the gap center Gc in the magnetic field generating portion 32B is represented by Lg, then a relationship between the length dimension Lg, the magnetic pole number P, the division number n and the length dimension lm, Lg=lm×n×P is satisfied.

A length dimension Lo in the circumferential direction at the face of the Halbach array field system 34B of the magnetic field generating portion 32B at the side thereof at which the gap 36 is formed is Lo=2×π×Rg×φ/360. If the pole pitch of the face of the Halbach array field system 34B at the side thereof at which the gap 36 is formed is represented by τ, then Lo=2×τ. If the permanent magnets 22 are in close proximity with one another, and if a length dimension of the permanent magnets 22 in the array direction (the circumferential direction) at the side of the Halbach array field system 34B at which the gap 36 is formed (the side at which the magnetic field is formed) is represented by lm', then Lo=n×lm'. Therefore, the permanent magnets 22 at the side of the Halbach array field system 34B at which the gap 36 is formed correspond with the length dimension lm'=Lo/n.

A length dimension Li in the circumferential direction at the face of the Halbach array field system 34A of the magnetic field generating portion 32B at the side thereof at which the gap 36 is formed (the side at which the magnetic field is formed) is Li=2×π×Ri×φ/360. If the pole pitch of the face of the Halbach array field system 34A at the side thereof at which the gap 36 is formed is represented by τ, then Li=2×τ. If the permanent magnets 22 are in close proximity with one another, and if a length dimension of the permanent magnets 22 in the array direction at the side of the Halbach array field system 34A at which the gap 36 is formed is represented by lm", then Li=n×lm". Therefore, the permanent magnets 22 at the side of the Halbach array field system 34A at which the gap 36 is formed correspond with the length dimension lm"=Li/n.

In the magnetic field generating portion 32A shown in FIG. 4A, the Halbach array field system 34B of the magnetic field generating portion 32B is replaced with the ferromagnetic body 30A. The ferromagnetic body 30A is formed in an annular shape with an inner radius the same as the radius of the gap center Gc. Thus, the inner periphery (inner periphery face) of the ferromagnetic body 30A is disposed at the gap center Gc. Therefore, the magnetic field generating portion 32A is similar to the magnetic field generating portion 28A deformed into an annular shape, and the magnetic field generating portion 32A provides the effects of a dual Halbach magnet array similarly to the magnetic field generating portion 28A.

In the Halbach array field system 34A of the magnetic field generating portion 32A, a length dimension in the circumferential direction of the face of the ferromagnetic body 30A at the side thereof at which the gap 36 is formed is the same as the length dimension Lc. Therefore, in the magnetic field generating portion 32A, if the length dimension of the whole circumference of the ferromagnetic body 30A at the side thereof at which the gap 36 is formed is represented by Lf, then a relationship between the length dimension Lf, the magnetic pole number P, the division number n and the length dimension lm, Lf=lm×n×P is satisfied.

A length dimension Li in the circumferential direction at the face of the Halbach array field system 34A of the magnetic field generating portion 32A at the side thereof at which the gap 36 is formed is Li=2×τ. If the permanent magnets 22 are in close proximity with one another, the permanent magnets 22 correspond to a length dimension lm" in the array direction at the side of the Halbach array field system 34A at which the gap 36 is formed, which is lm"=Li/n. The pole pitch τ is the range in which the magnetization direction reverses (the range in which the magnetization direction changes by 180°) in one set of the permanent magnets 22 (22A to 22D). Therefore, if there are gaps between the permanent magnets 22, the pole pitch τ can be considered as a range including these gaps.

The gap length G in the magnetic field generating portion 32A falls in a range from 0.25 times to 1.0 times the pole pitch τ (0.25 τ≤G≤1.0 τ). Thus, the gap length G and the division number n have a relationship such that the gap length G falls in a range from (0.125×n×lm) times to (0.5×n×lm) times the length dimension lm of the permanent magnets 22 in the array direction (($0.125×n×lm$)≤G≤(0.5× n×lm)).

As shown in FIG. 1, the magnetic field generating portion 24 of the electric motor 10 employs a structure similar to the magnetic field generating portion 32A. In the field portion 16 of the magnetic field generating portion 24, the Halbach array field system 34A in which the permanent magnets 22 are arranged in an annular shape is employed, and a ferromagnetic material is used for the outer cylinder portion 18 of the stator 14 surrounding the field portion 16 (the outer cylinder portion 18 corresponds to the ferromagnetic body 30A). Therefore, a magnetic flux distribution between the field portion 16 and outer cylinder portion 18 of the electric motor 10 is the same as a magnetic flux distribution between the Halbach array field system 34A and the gap center Gc of the magnetic field generating portion 32B.

In this magnetic field generating portion 24, an arbitrary dimension may be employed for a thickness dimension ly, which is a dimension of the outer cylinder portion 18 in the radial direction. When the thickness dimension ly of the outer cylinder portion 18 is reduced, an increase in an outer diameter dimension of the electric motor 10 may be suppressed and power output density of the electric motor 10 may be improved, and torque ripple due to magnetic saturation in the outer cylinder portion 18 tends to occur in the electric motor 10. However, because the Halbach array field system 26A is employed at the field portion 16, an effect that a Halbach magnet array may suppress torque ripple is provided.

When the thickness dimension ly of the outer cylinder portion 18 is increased, it is more difficult to suppress an increase in the outer diameter dimension of the electric motor 10, but magnetic saturation in the outer cylinder portion 18 may be suppressed, and torque ripple may be suppressed effectively.

Therefore, it is preferable for the thickness dimension ly of the outer cylinder portion 18 to be a largest dimension at which magnetic flux saturation occurs in the outer cylinder portion 18 (or ly may be a smallest dimension at which magnetic flux saturation does not occur in the outer cylinder portion 18). Consequently, an increase in the outer diameter dimension of the electric motor 10 may be suppressed and power output density may be increased even while torque ripple may be suppressed effectively.

Figure 5:
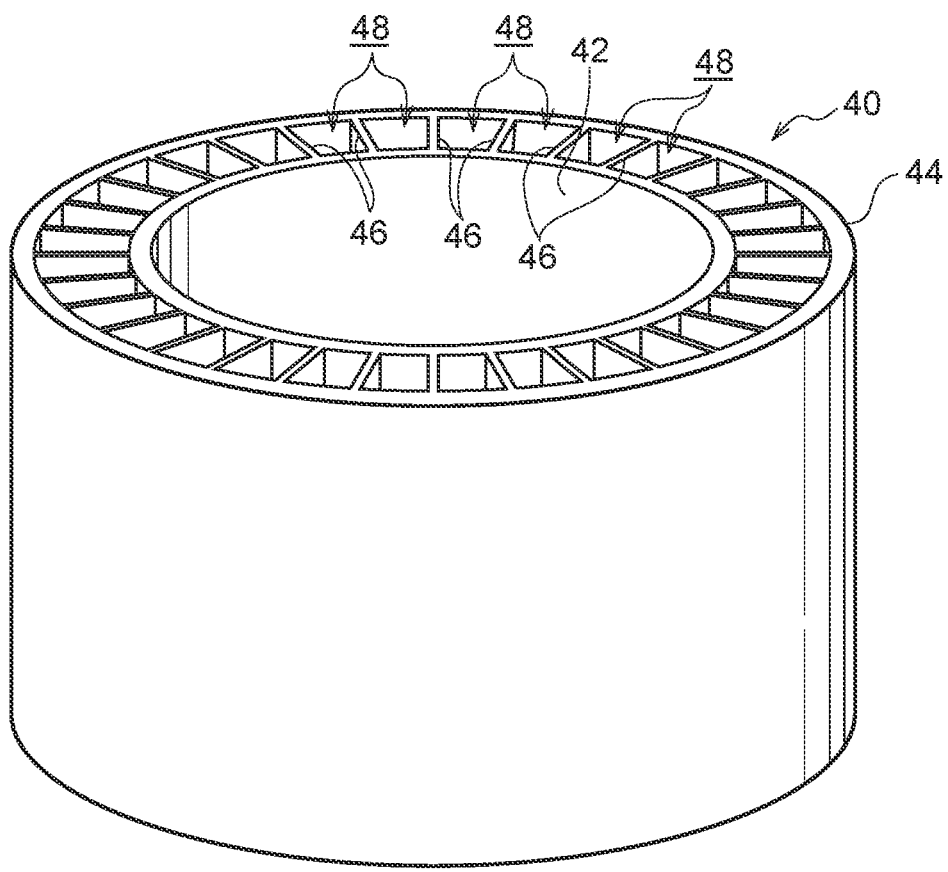
FIG. 5 is a perspective view showing a field magnet holder according to the present exemplary embodiment.
Figure 6:
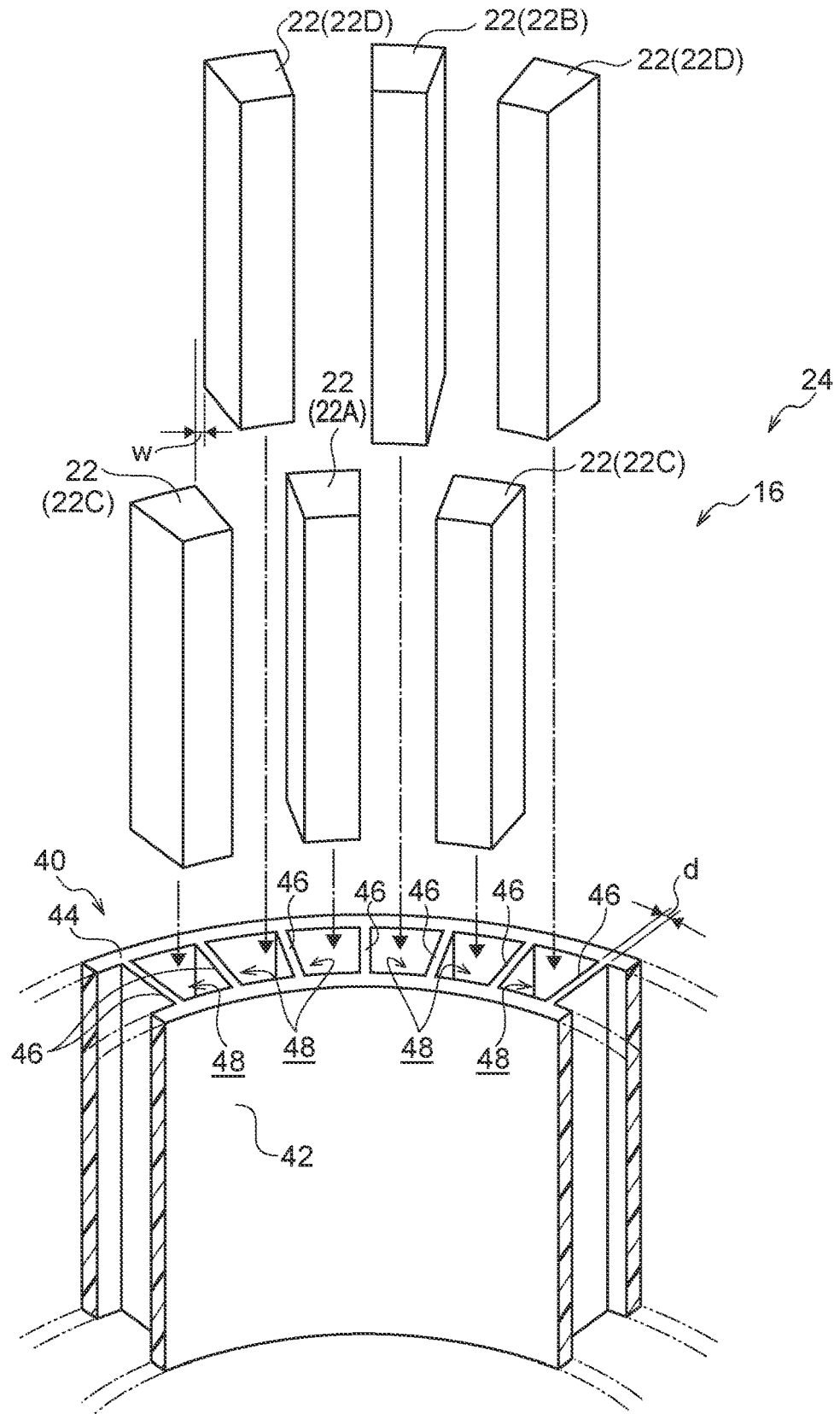
FIG. 6 is a perspective view showing principal portions of a field portion according to the present exemplary embodiment.

A field magnet holder 40 that serves as a retaining member is provided at the rotor 12 of the electric motor 10. FIG. 5 shows schematic structures of the field magnet holder 40 in a perspective view, and FIG. 6 shows principal portions of the field portion 16 in a perspective view.

A non-magnetic material (a material that does not have magnetism) is used for the field magnet holder 40. The non-magnetic material employed at the field magnet holder 40 may be a paramagnetic body, may be a diamagnetic body and may be one of various resin materials (synthetic resins). Aluminum, any of various transition metals and any of various synthetic resins may be employed in the field magnet holder 40. In the present exemplary embodiment, with a view to both providing high strength and stiffness and enabling weight reduction, a carbon fiber reinforced plastic (CFRP) is used in the field magnet holder 40.

As shown in FIG. 5, the field magnet holder 40 is provided with an inner wall 42 that serves as an inner periphery wall and an outer wall 44 that serves as an outer periphery wall. The inner wall 42 and the outer wall 44 are each formed in a substantially annular shape with a predetermined thickness. In the field magnet holder 40, the outer diameter of the inner wall 42 is smaller than the inner diameter of the outer wall 44, the central axis of the inner wall 42 is superposed with the central axis of the outer wall 44, and the inner wall 42 is coaxially disposed inside the outer wall 44. In the present exemplary embodiment, a dimension of the field magnet holder 40 in the axial direction thereof is the same as a dimension of the permanent magnets 22 in a direction orthogonal to the magnetization directions thereof.

In the field magnet holder 40, a spacing between an outer periphery face of the inner wall 42 and an inner periphery face of the outer wall 44 is similar to a radial direction dimension of the deformed permanent magnets 22. Thus, the field magnet holder 40 is formed in a substantially annular shape overall, an inner periphery face of the inner wall 42 of the field magnet holder 40 is fixed (adhered) to the power output shaft 12A of the rotor 12, and the field magnet holder 40 is arranged to be integrally rotatable with the rotor 12.

As shown in FIG. 1, FIG. 5 and FIG. 6, a plural number of spacers 46 that serve for spacing between the inner wall 42 and the outer wall 44 are provided in the field magnet holder 40. The inner wall 42, outer wall 44 and spacers 46 of the field magnet holder 40 are formed by integral molding of a resin. The spacers 46 are respectively arranged along the radial direction of the field magnet holder 40 at a predetermined spacing in the circumferential direction of the field magnet holder 40.

In the field magnet holder 40, the spacers 46 are respectively provided at positions to be between mutually adjacent permanent magnets 22, and the arrangement spacings of the spacers 46 are substantially the same as lengths of the permanent magnets 22 in the circumferential direction. For example, a spacing dimension in the circumferential direction at the side of the spacers 46 at which the outer wall 44 is disposed is the same as a dimension in the circumferential direction of outer periphery faces of the permanent magnets 22 of the field portion 16, and a spacing dimension in the circumferential direction at the side of the spacers 46 at which the inner wall 42 is disposed is the same as a length dimension in the circumferential direction of inner periphery faces of the permanent magnets 22 of the field portion 16.

Accordingly, 32 (k×n) of the spacers 46 are formed in the field magnet holder 40. Thus, sockets 48 into which the permanent magnets 22 are to be inserted are formed between mutually adjacent spacers 46 in the same number as the number of the permanent magnets 22. The sockets 48 are formed with respective opening cross-sectional shapes, cut in directions (the radial direction) orthogonal to the axial direction of the field magnet holder 40, that are similar to cross-sectional shapes in the magnetization directions of the permanent magnets 22. Thus, the respective opening cross-sectional shapes of the sockets 48 are similar to the cross-sectional shapes in the magnetization directions of the permanent magnets 22 to be installed in the field magnet holder 40.

In the rotor 12 of the electric motor 10, the permanent magnets 22 are inserted into the respective sockets 48 of the field magnet holder 40. Periphery faces of the inserted permanent magnets are joined to the outer periphery face of the inner wall 42, the inner periphery face of the outer wall 44 and inner faces of the spacers 46 (inner faces of the sockets 48) of the field magnet holder 40 by adhesion or the like.

In the Halbach magnet array, the spacing of the permanent magnets 22 influences the magnetic field. Thus, in the magnetic field generating portion 24, a thickness dimension d, which is a dimension of the spacers 46 of the field magnet holder 40 in the circumferential direction, influences the magnetic field that is formed by the field portion 16.

The thickness dimension d (mm) of the spacers 46 of the field magnet holder 40 is specified in accordance with the length dimension lm (mm) of the installed permanent magnets 22 in the array direction and the division number n. The thickness dimension d of the spacers 46 of the field magnet holder 40 is specified on the basis of the length dimension lm of the permanent magnets 22 in the array direction and the division number n so as to satisfy expression (1).

$$0 < d \leq lm \times 1/(n+1) \times 1.5 \qquad (1)$$

Here, $lm \times 1/(n+1) \times 1.5 = lm \times 1.5/(n+1)$. In the field magnet holder 40 that is formed of non-magnetic material, the outer wall 44 of the magnetic field generating portion 24 at the outer side of the permanent magnets 22 is included in the area S2, and the spacers 46 between the permanent magnets 22 are included in the area S4.

In the electric motor 10 that is structured thus, the magnetic field generating portion 24 is formed by the field portion 16 of the rotor 12 and the outer cylinder portion 18 of the stator 14, and the armature 20 (the coils 20U to 20W) is disposed in the magnetic field generating portion 24. Therefore, when three-phase AC electric power at a predetermined voltage is supplied to the respective coils 20U to 20W of the electric motor 10, the rotor 12 is rotated and the power output shaft 12A is driven to rotate. The power output shaft 12A of the electric motor 10 is driven to rotate at a rotary speed according to a frequency of the three-phase AC electric power being supplied to the respective coils 20U to 20W.

In the magnetic field generating portion 24 of the electric motor 10, the field portion 16 is surrounded by the outer cylinder portion 18, the outer cylinder portion 18 opposes each of the permanent magnets 22 of the field portion 16, and the Halbach array field system 34A is formed of the plural permanent magnets 22 in the field portion 16. In the magnetic field generating portion 24, the outer cylinder portion 18 is disposed relative to the field portion 16 at a position corresponding to the gap center Gc of the Halbach array field systems 34A and 34B in a dual Halbach magnet array, and the ferromagnetic material (ferromagnetic body) is used for the outer cylinder portion 18. Therefore, a magnetic field the same (or a similar magnetic field) as if the dual Halbach array field system were employed is formed between the field portion 16 and the outer cylinder portion 18 of the magnetic field generating portion 24.

As a result, the effect of a dual Halbach magnet array in that torque ripple may be suppressed is suitably reproduced in the electric motor 10. Thus, with the electric motor 10 using the single Halbach array field system 34A, similar effects to the dual Halbach array field system using the Halbach array field systems 34A and 34B are provided, and torque ripple is suppressed in the electric motor 10.

The outer cylinder portion 18 of the electric motor 10 is disposed at the radial direction outer side of the field portion 16 and fixed. Therefore, the outer cylinder portion 18 may be provided with the function of a casing. Hence, the electric motor 10 may be reduced in size and a number of components may be reduced, costs may be lowered, and power output density may be improved. Moreover, because a Halbach magnet array is used in the electric motor 10, the number of the permanent magnets 22 may be reduced compared to a structure employing a dual Halbach magnet array. Thus, weight may be further reduced and costs may be further lowered, and the power output density may be improved effectively.

In general, among electrical machines whose radial direction cross sections have similar shapes and that have the same length in the axial direction, power output (rotary angular velocity×torque) increases proportionally to the cube of the scale factor. The electric motor 10 may have greater margin for size in the radial direction than a structure employing a dual Halbach magnet array. Therefore, power output of the electric motor 10 may be increased. Consequently, the electric motor 10 may be expected to provide greater power output density (the ratio of power output to weight) than a structure employing a dual Halbach magnet array.

In the electric motor 10, the coils 20U to 20W are formed as air-core coils and Litz wire is used in the coils 20U to 20W. Because the coils 20U to 20W of the electric motor 10 are air-core coils, counter-electromotive forces may be suppressed, and heating of switching components in an inverter circuit performing inverter control may be suppressed. Because Litz wire is used for the windings of the coils 20U to 20W, inductance may be reduced, and heating and counter-electromotive forces produced at each of the coils 20U to 20W may be suppressed effectively. Therefore, a rated rotary speed of the electric motor 10 may be raised and the electric motor 10 may run faster.

In the electric motor 10, the outer cylinder portion 18 at which the armature 20 (the coils 20U to 20W) is disposed does not rotate. Therefore, cooling means such as a cooling fan, cooling pipes or the like may be used to cool the outer cylinder portion 18, and the armature 20 at the inner side of the outer cylinder portion 18 may be cooled together with the outer cylinder portion 18. Consequently, the electric motor 10 may suppress heating effectively, and may output large torques for short durations.

Now, assembly of the permanent magnets 22 in the field portion 16 of the magnetic field generating portion 24 is described.

In the field portion 16 of the magnetic field generating portion 24, the plural permanent magnets 22 are arrayed in the circumferential direction and the magnetization directions of the adjacent permanent magnets 22 are changed in steps of the angle θ.

The field magnet holder 40 is used in the field portion 16 of the magnetic field generating portion 24. The plural spacers 46 are provided at the field magnet holder 40 between the inner wall 42 and outer wall 44, forming the plural sockets 48 into which the respective permanent magnets 22 are to be inserted. The sockets 48 are formed in the same number as the number of the permanent magnets 22 to be used in the field portion 16. The sockets 48 are arrayed in the circumferential direction of the field magnet holder 40. Therefore, the field portion 16 can be assembled by the plural permanent magnets 22 being successively inserted into the respective sockets 48 of the field magnet holder 40 such that the magnetization directions thereof change in steps of the predetermined angle θ.

Attraction forces and repulsion forces act between the permanent magnets 22 that are adjacent to one another. The magnetization directions of the permanent magnets 22 are offset in units of the predetermined angle 0, and the adjacent permanent magnets 22 are in very close proximity. Therefore, when arrangement of the permanent magnets 22 sequentially in the circumferential direction is attempted, large attraction forces and repulsion forces may act between the adjacent permanent magnets 22 in directions causing the permanent magnets 22 to rotate.

The plural permanent magnets 22 used in the field portion 16 have similar shapes in cross sections in the magnetization directions. The sockets 48 are formed in the field magnet holder 40 in the same number as the number of the permanent magnets 22. Because the magnetization direction of the permanent magnet 22 that is to be inserted into one of the sockets 48 of the field magnet holder 40 is fixed, the magnetization directions of the permanent magnets 22 to be inserted into all of the sockets 48 are fixed. Movements of the permanent magnets 22 in the respective sockets 48 are restricted by the inner wall 42, the outer wall 44 and the spacers 46. Attraction forces and repulsion forces acting between the permanent magnets 22 are weaker the further the permanent magnets 22 are in distance from one another.

Accordingly, in the field magnet holder 40, the permanent magnets 22 are inserted into sockets 48 that are spaced apart by at least one (by one or a predetermined number) other of the sockets 48. Thus, assembly of the permanent magnets 22 is made easier. For example, as illustrated in FIG. 6, the permanent magnets 22A and 22C are successively inserted into the respectively corresponding sockets 48 of the field magnet holder 40, after which the permanent magnets 22B and 22D are successively inserted into the sockets 48 separated by the permanent magnets 22A and 22C. Therefore, even if large attraction forces and repulsion forces act between the permanent magnets 22, the plural permanent magnets 22 are arrayed and assembled in the circumferential direction easily.

In the field magnet holder 40, movements of the permanent magnets 22 that have been inserted into the sockets 48 are restricted by the inner wall 42, outer wall 44 and spacers 46. Therefore, the permanent magnets 22 that have already been inserted into the sockets 48 of the field magnet holder 40 and are subject to magnetic forces from the permanent magnets 22 being subsequently inserted into the sockets 48 may be restricted from moving. Thus, assembly of the permanent magnets 22 into the field magnet holder 40 may be facilitated effectively.

Therefore, when the plural permanent magnets 22 are to be disposed in close proximity to one another in the field magnet holder 40, assembly of each of the plural permanent magnets 22 may be made easier, and assembly of the field portion 16 in which the plural permanent magnets 22 are arrayed in the circumferential direction may be made easier.

A carbon fiber reinforced plastic (CFRP) is used in the field magnet holder 40. Therefore, when the permanent magnets 22 are being assembled to the field magnet holder 40, even when attraction forces and repulsion forces act between the permanent magnets 22 that are adjacent to one another, deformation of the inner wall 42, outer wall 44 and spacers 46 (distortion of the sockets 48) does not occur. Therefore, the plural permanent magnets 22 may be retained at constant positions in the field magnet holder 40.

The permanent magnets 22 that are inserted into the sockets 48 of the field magnet holder 40 are adhered or the like to be fixed to the inner periphery faces of the sockets 48 of the field magnet holder 40 (faces of the inner wall 42, outer wall 44 and spacers 46). Therefore, the permanent magnets 22 are assuredly fixed to the rotor 12 via the field magnet holder 40.

When the rotor 12 of the electric motor 10 rotates, centrifugal forces act on the permanent magnets 22 of the field portion 16. As the rotary speed of the electric motor 10 rises, the centrifugal forces acting on the permanent magnets 22 increase. However, the outer wall 44 is formed at the radial direction outer side of the field magnet holder 40, and the outer wall 44 is connected to the inner wall 42 by the plural spacers 46 of the field magnet holder 40. Therefore, even when large centrifugal forces act on the permanent magnets 22 in the field magnet holder 40 due to the rotor 12 rotating, the outer wall 44 may effectively restrict movements of the permanent magnets 22 to the radial direction outer side, and the permanent magnets 22 may be retained effectively. Thus, because the field magnet holder 40 is provided, the electric motor 10 may rotate stably at high speeds. Moreover, because CFRP with high strength and stiffness is used in the field magnet holder 40, shifting of the permanent magnets 22 by centrifugal forces may be assuredly restricted, and stable high-speed rotation of the electric motor 10 may be maintained.

In a Halbach magnet array, spacings between the mutually adjacent permanent magnets 22 strongly influence the magnetic field formed by the permanent magnets 22 (by the field portion 16). In the electric motor 10, the spacing between the mutually adjacent permanent magnets 22 is slightly widened due to the spacers 46 of the field magnet holder 40, and the spacing of the mutually adjacent permanent magnets 22 is fixed. In the field magnet holder 40, the thickness dimension d of the spacers 46 in relation to the length dimension lm that serves as a reference is in the range $0 < d \leq (lm \times 1/(n+1)) \times 1.5$, and a spacing dimension w between the mutually adjacent permanent magnets 22 is $0 < w \leq lm \times 1/(n+1) \times 1.5$.

In general in a Halbach magnet array, a magnetic flux density at a position that is a predetermined distance away from the arrayed permanent magnets 22 is influenced by the spacing between the mutually adjacent permanent magnets 22 (the spacing dimension w). The wider the spacing between the mutually adjacent permanent magnets 22, the more magnetic flux leakage occurs, and the lower the magnetic flux density. A reduction in magnetic flux density leads to a reduction in power output torque of the electric motor 10.

In the Halbach magnet array, a spatial harmonic of a magnetic flux distribution at a predetermined position relative to the permanent magnets 22 is at approximately zero when the angle $\theta = 360°/n$ (n is the division number) and the spacing dimension w of the adjacent permanent magnets 22 is $1/(n+1)$ of the length dimension lm in the array direction of the permanent magnets 22 (i.e., $w = lm \times 1/(n+1)$). For example, the spatial harmonic of the magnetic flux distribution at the predetermined position of the permanent magnets 22 is at approximately zero when the division number $n = 4$ and the spacing dimension $w = lm/5$.

Figure 7A:
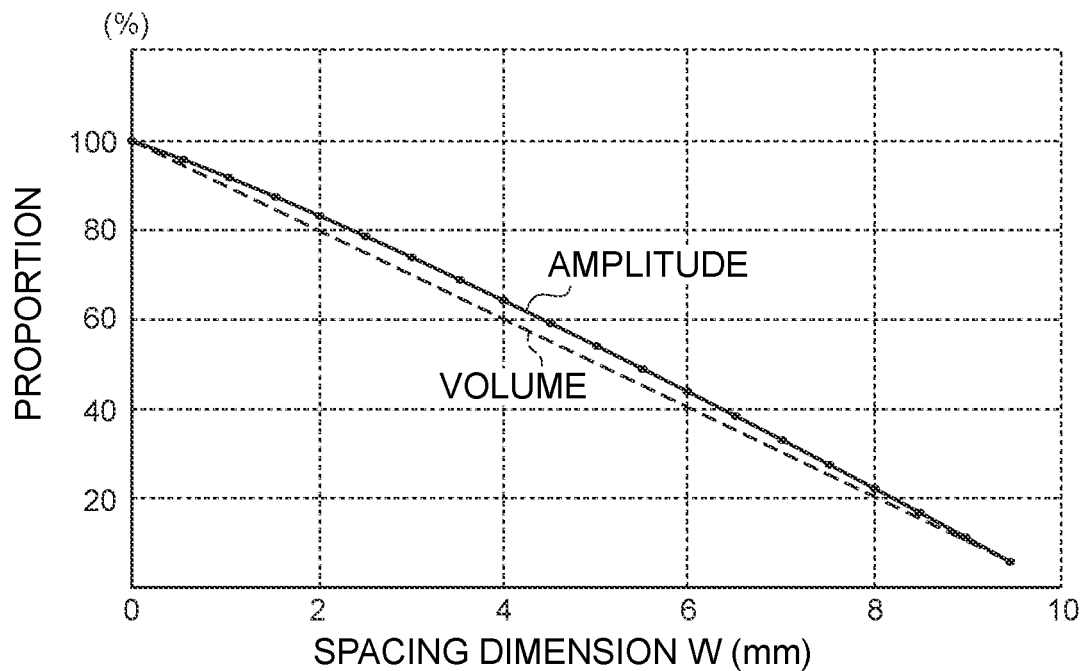
FIG. 7A is a graph showing changes in volume ratio and changes in amplitude of a fundamental against a spacing dimension of permanent magnets when n=4.
Figure 7B:
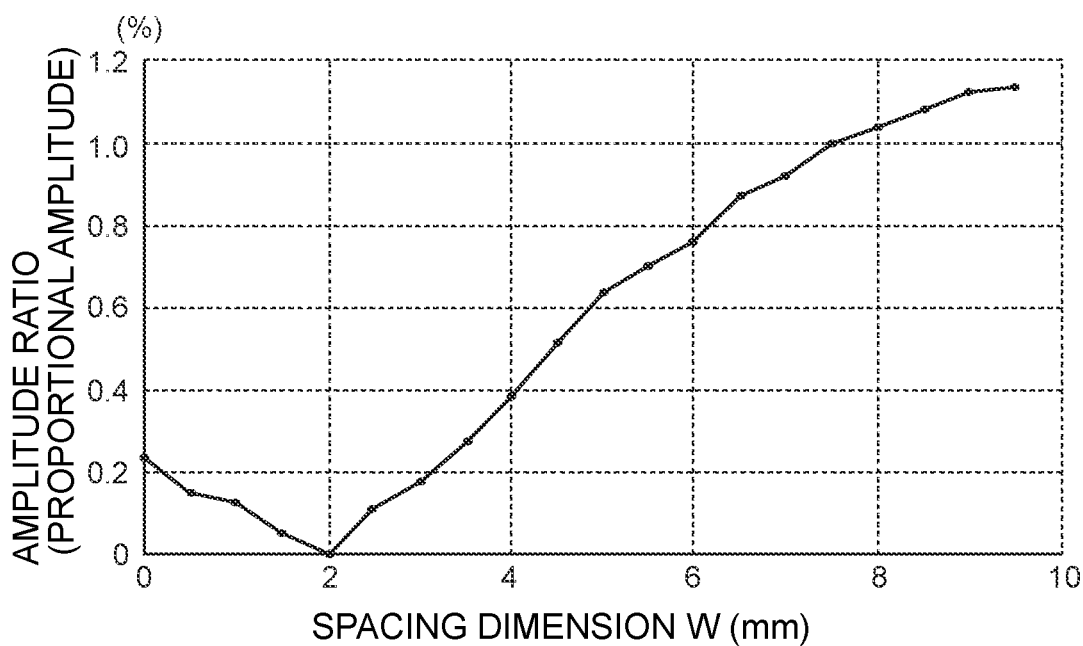
FIG. 7B is a graph showing changes in amplitude ratio of a fifth harmonic to the fundamental harmonic against the spacing dimension of the plural magnets when n=4.

FIG. 7A shows proportional amplitudes (%) of the fundamental harmonic of a spatial magnetic flux distribution at the gap center Gc of a dual Halbach magnet array and proportional volumes (%) of the permanent magnets 22 thereof against spacing dimensions w of the permanent magnets 22, when the angle θ of the magnetization directions of the permanent magnets 22 is 90° (the angle θ when the division number n=4). FIG. 7B shows amplitude ratios (proportional amplitudes, %) of a fifth (order n+1) spatial harmonic relative to the fundamental harmonic of the spatial magnetic flux distribution against spacing dimensions w of the permanent magnets 22 at the gap center Gc when the angle θ=90°.

Using the spacing dimension w=0 as a reference, the proportional amplitudes of the fundamental harmonic of the spatial magnetic flux density distribution and the proportional volumes are proportions relative to the amplitude of the fundamental harmonic when the spacing dimension w=0 and proportions of the volume when the spacing dimension w=0. As the spacing dimension w increases, the volume of the permanent magnets 22 decreases. In FIG. 7A and FIG. 7B, the length dimension lm serving as the reference in the array direction of the permanent magnets 22 (a length dimension in the circumferential direction) at the side of the permanent magnets 22 at which the armature 20 is disposed is 10 mm, and the gap length 2G is set to 1.5 times the length dimension lm (2G=15 mm).

As shown in FIG. 7A, the proportional volume of the permanent magnets 22 (volume percentages) and amplitude of the fundamental harmonic change substantially proportionally with the spacing dimension w of the permanent magnets 22. As the spacing dimension w of the permanent magnets 22 increases, the proportional volume of the permanent magnets 22 and the proportional amplitude of the fundamental harmonic decrease.

In a dual Halbach magnet array, when the angle θ=90°, it is known that a harmonic of order (n+1) is generated in the magnetic field (in the gap). As illustrated in FIG. 7B, the proportional amplitude (amplitude ratio) of the fifth harmonic relative to the amplitude of the fundamental harmonic is at a minimum (substantially zero) when the spacing dimension w is 2 mm (=lm×1/(n+1)). Therefore, the fifth harmonic can be considered to be eliminated when the division number n=4 and the spacing dimension w=2 mm.

When the division number n=4, the spacing dimension w being 2 mm corresponds to a fifth (1/(n+1)) of the length dimension lm (in mm) of the permanent magnets 22. As illustrated in FIG. 7A, the amplitude of the fundamental when the spacing dimension w=2 mm is reduced by approximately 20%.

As shown in FIG. 7B, in a range of the spacing dimension w of the permanent magnets 22 up to 3 mm (0<w≤3), the fifth harmonic is at proportional amplitudes similar to the fifth harmonic when the spacing dimension w=0. Thus, no increase in the fifth harmonic relative to the fundamental harmonic is apparent.

Figure 8A:
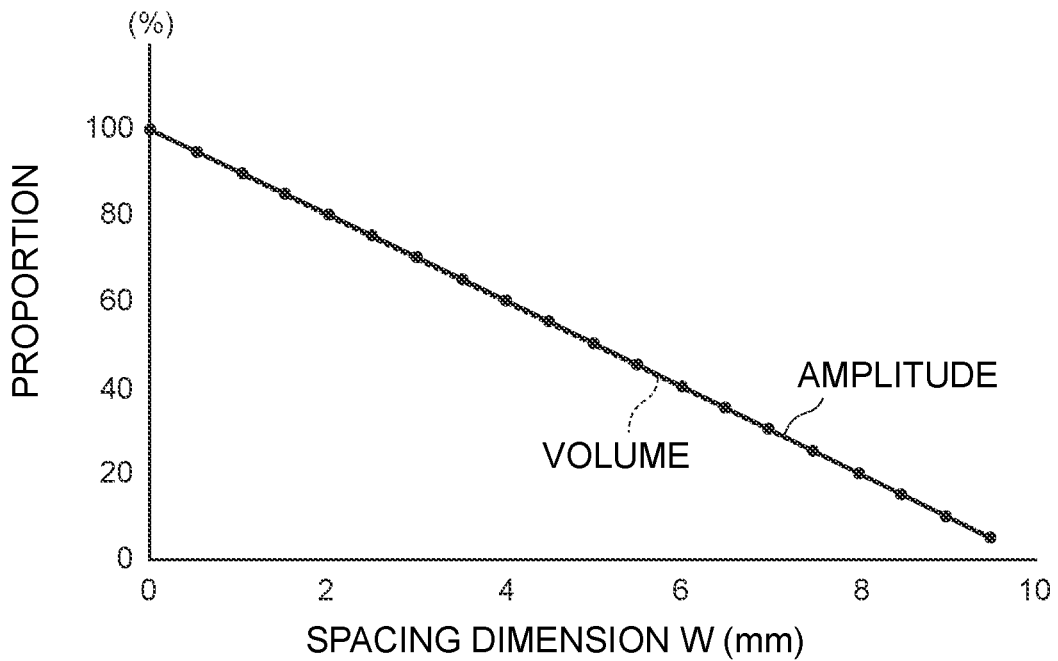
FIG. 8A is a graph showing changes in volume ratio and changes in amplitude of a fundamental against a spacing dimension of plural magnets when n=8.
Figure 8B:
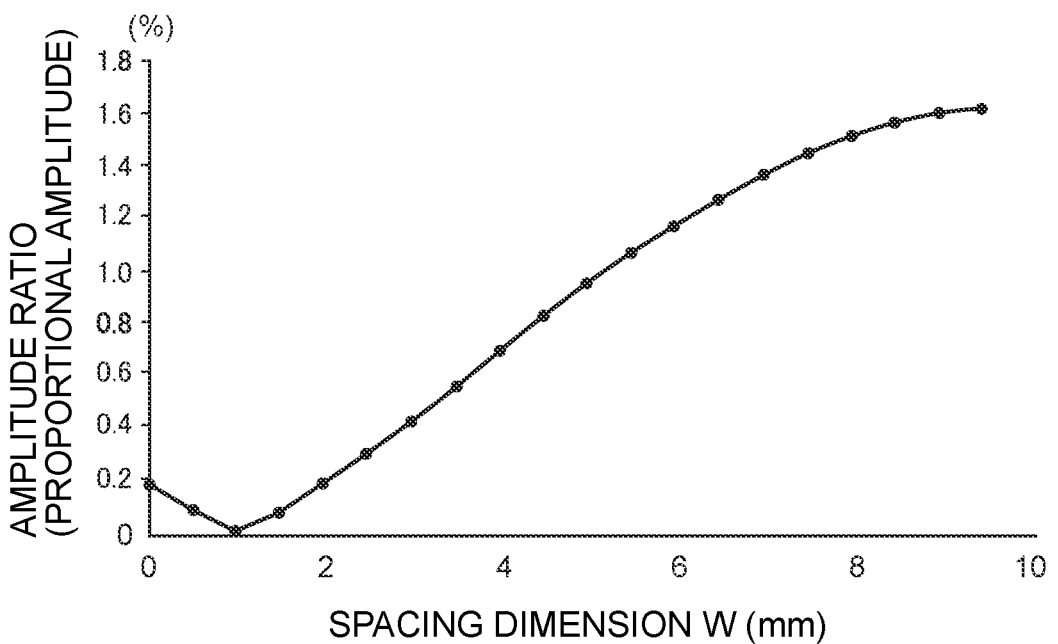
FIG. 8B is a graph showing changes in amplitude ratio of a fifth harmonic to the fundamental harmonic against the spacing dimension of the plural magnets when n=8.

FIG. 8A shows proportional amplitudes (%) of the fundamental harmonic of a spatial magnetic flux distribution at the gap center of a dual Halbach magnet array and proportional volumes (%) of the permanent magnets 22 thereof against spacing dimensions w of the permanent magnets 22, when the angle θ of the magnetization directions of the permanent magnets 22 is 45° (the angle θ when the division number n=8). FIG. 8B shows amplitude ratios (proportional amplitudes, %) of a ninth (order n+1) spatial harmonic relative to the fundamental harmonic of the spatial magnetic flux distribution against changes in the spacing dimension w at the gap center Gc of the permanent magnets 22 when the angle θ=45°.

As shown in FIG. 8A, also when the angle θ=45°, the proportional volume of the permanent magnets 22 and proportional amplitude of the fundamental change substantially proportionally with the spacing dimension w of the permanent magnets 22. As the spacing dimension w of the permanent magnets 22 increases, the proportional volume of the permanent magnets 22 and the proportional amplitude of the fundamental decrease.

As shown in FIG. 8B, the amplitude ratio is at a minimum (substantially zero) for the angle θ=45° when the spacing dimension w is approximately 1 mm (corresponding to lm×1/9). Thus, the ninth harmonic can be considered to be eliminated when the spacing dimension w≈1 mm.

At this spacing dimension w that is considered to eliminate the ninth harmonic, the amplitude of the fundamental harmonic is reduced by approximately 10% (see FIG. 8A). When the spacing dimension w=1.7 mm (corresponding to w=lm×1/9×1.5), the proportional amplitude of the fundamental is similar to the proportional amplitude when the spacing dimension w=0. Therefore, it is apparent that no increase in the ninth harmonic relative to the fundamental is seen in a range of 0≤w≤1.7. This range of the spacing dimension w is a range up to a ninth (=1/(n+1)) of the length dimension lm in the array direction of the permanent magnets 22 when the angle θ=45° (the division number n=8).

Thus, it is preferable if the spacing dimension w of the permanent magnets 22 in a Halbach magnet array is 0≤w≤lm×1/(n+1)×1.5. Hence, in Halbach magnet arrays (a single Halbach magnet array or a dual Halbach magnet array), an increase in harmonics due to the spacing dimension w of the mutually adjacent permanent magnets 22 may be suppressed by setting the spacing dimension w of the mutually adjacent permanent magnets 22 in the range 0≤w≤lm×1/(n+1)×1.5 (in which n is the division number and lm is the length dimension of the permanent magnets 22 in the array direction at the side thereof at which the armature 20 is disposed). Harmonics may be suppressed effectively by setting the spacing dimension w to w=lm×1/(n+1).

Provided the thickness dimension d of the spacers 46 provided in the field magnet holder 40 is a dimension not exceeding lm×1/(n+1)×1.5 (mm) (i.e., 0<d<lm×1/(n+1)×1.5), an increase in harmonics due to the provision of the spacers 46 may be suppressed. In particular, harmonics may be suppressed effectively by setting the thickness dimension d of the spacers of the field magnet holder 40 to lm×1/(n+1). Therefore, it is sufficient that the field magnet holder 40 be formed with dimensions and material such the thickness dimension d of the spacers 46 is within the range described above and required strength is provided.

Thus, it is sufficient for the field magnet holder 40 to be formed with a thickness dimension d that satisfies the conditions described above. Regarding cross-sectional areas in the radial direction cross section of a dual Halbach magnet array, it is sufficient for the field magnet holder 40 to be formed such that the ratio of the cross-sectional area between the gap center Gc and the Halbach magnet array at the radial direction inner side to the cross-sectional area between the gap center Gc and the Halbach magnet array at the radial direction outer side is the same as the ratio of the cross-sectional area of the Halbach magnet array at the radial direction inner side to the cross-sectional area of the Halbach magnet array at the radial direction outer side. In this regard, the field magnet holder 40 should be formed such that the spacers 46 are included in the area S4 of the Halbach magnet array at the radial direction inner side, which corresponds to the field portion 16, and the field magnet holder 40 should be specified such that the thickness dimension d of the spacers 46 is included in the pole pitch τ and the length dimension lm of the permanent magnets 22 in the array direction.

In the present exemplary embodiment described above, an example of the field magnet holder 40 is described that is equipped with the inner wall 42, the outer wall 44 and the spacers 46 corresponding to the number of the permanent magnets 22. However, provided the retaining member is equipped with at least an outer periphery wall and dividing walls, an inner periphery wall may be omitted. In this situation, for example, a rotary shaft that serves as the power output shaft of the rotor may be employed as the inner periphery wall of the retaining member, and the permanent magnets may be assembled by inserting the permanent magnets between the dividing walls of the retaining member in a state in which the retaining member has been assembled to the rotary shaft.

The retaining member may have a structure in which an inner periphery wall is employed when the permanent magnets are being assembled and the inner periphery wall is removed after the assembly. Provided the retaining member may restrict movements of the permanent magnets with the outer periphery wall and dividing walls or with the outer periphery wall, inner peripheral wall and dividing walls, the retaining member may have a shape in which apertures are formed in portions of the outer periphery wall, inner periphery wall and dividing walls, in a lattice pattern or the like.

In the present exemplary embodiment, the Halbach array field system 34A at the outer side of the magnetic field generating portion 32B is replaced with the ferromagnetic body 30A. However, the magnetic field generating portion may have a structure in which the Halbach array field system at the radial direction inner side is replaced with a ferromagnetic body.

Figure 9:
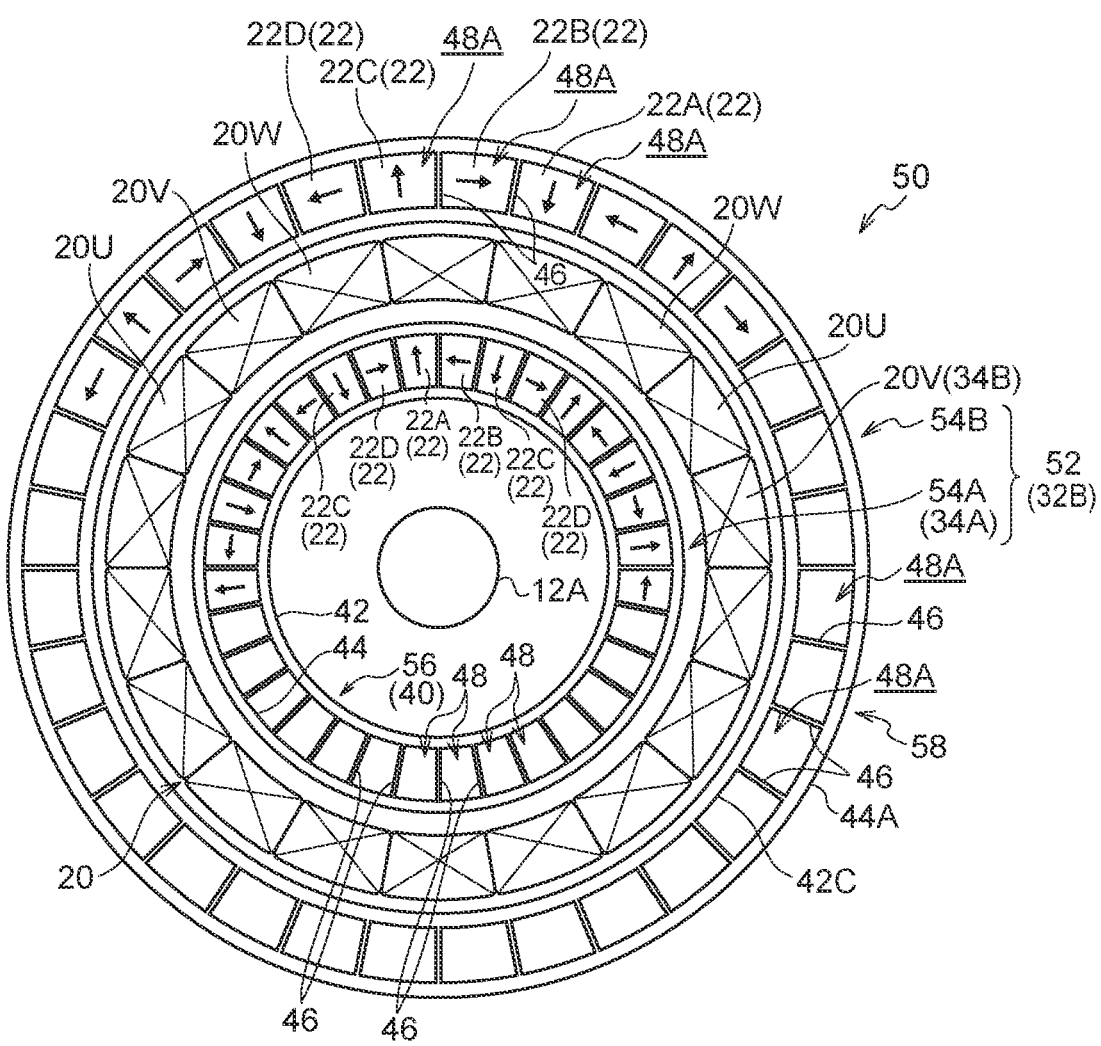
FIG. 9 is a schematic diagram showing principal portions of an electric motor according to a variant example.

In the present exemplary embodiment, the magnetic field generating portion 32A is employed in the magnetic field generating portion 24 of the electric motor 10, but the magnetic field generating portion 32B may be employed in the magnetic field generating portion 24. In other words, a dual Halbach magnet array may be employed in the rotating electrical machine. FIG. 9 shows schematic structures of an electric motor 50 according to a variant example in a plan view.

As shown in FIG. 9, a magnetic field generating portion 52 of the electric motor 50 uses a field portion 54A serving as a first field portion, which employs the Halbach array field system 26A, and a field portion 54B serving as a second field portion, which employs the Halbach array field system 26B. The field portions 54A and 54B are formed in substantially annular shapes, the field portion 54A is disposed coaxially inside the field portion 54B, spaced apart by the gap length 2G, and the field portions 54A and 54B are integrally rotatable. In the electric motor 50, the armature 20 is disposed between the field portion 54A and the field portion 54B, and the armature 20 is relatively rotatable with respect to the field portions 54A and 54B.

Thus, in the electric motor 50, when three-phase AC electric power is supplied to the coils 20U to 20W of the armature 20, the field portions 54A are 54B integrally rotate relative to the armature 20, and the power output shaft 12A is driven to rotate.

In the electric motor 50, a field magnet holder 56 that serves as a first retaining member and a field magnet holder 58 that serves as a second retaining member are used in, respectively, the field portion 54A and the field portion 54B. The field magnet holders 56 and 58 are each similar in basic structure to the field magnet holder 40. That is, the field magnet holder 56 is similar to the field magnet holder 40. Meanwhile, the field magnet holder 58 is provided with an inner wall 42A corresponding to the inner wall 42 and an outer wall 44A corresponding to the outer wall 44, the spacers 46 are arranged between the inner wall 42A and the outer wall 44A, and sockets 48A corresponding to the sockets 48 are formed.

Because the field magnet holders 56 and 58 are used in the electric motor 50 with this structure, respective positions of the permanent magnets 22 (22A to 22D) in each of the field portions 54A and 54B may be restricted and assembly of the permanent magnets 22 is easy. Therefore, similarly to the electric motor 10, fabrication of the electric motor 50 is made easier.

In the present exemplary embodiment and variant example described above, examples are principally described in which the division number n=4, but the division number n that is employed may be any integer that is at least 3. In an electric motor that is driven by three-phase AC electric power, with a view to more precise and greater suppression of torque ripple, it is more preferable if the division number n is n=3·k+2 (in which k is a positive integer). As a result, torque ripple in a power source using three-phase AC electric power may be suppressed effectively.

In the present exemplary embodiment and variant example, the electric motors 10 and 50 are described as examples. However, the rotating electrical machine may be a generator that generates three-phase AC electric power when rotated. When a generator is employed as the rotating electrical machine, output power density of the generator may be improved.

In the present exemplary embodiment and variant example, the electric motors 10 and 50 are described as examples. However, a rotating electrical machine may be used that operates as a drive source for a power running mode of a vehicle and that operates as a regenerating generator in a low speed mode (a regeneration mode). In this situation, even though the direction of current is reversed in switching between the power running mode and the regeneration mode, magnetic energy accumulating at the armature may be suppressed (reduced). Therefore, induced voltages produced in the rotating electrical machine at times of current switching may be lowered, and damage by the rotating electrical machine to a driving circuit that drives the rotating electrical machine may be suppressed. Moreover, the rotating electrical machine may provide driving characteristics of the vehicle with excellent response.

The disclosures of Japanese Patent Application No. 2019-171621 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:
1. A rotating electrical machine comprising:
  a field portion including a plurality of permanent magnets arranged in a circumferential direction, with magnetization directions thereof being successively changed in steps of an angle that is a full cycle of electrical angles divided by a division number n, the division number n being any one integer that is at least three;

a retaining member that is a non-magnetic material, the retaining member including:

an annular outer periphery wall, respective outer periphery faces of the permanent magnets abutting against an inner periphery face of the outer periphery wall and, in the circumferential direction of the outer periphery wall, a plurality of dividing walls that respectively project to the inner side in the radial direction from the inner face of the outer periphery wall, the permanent magnets being respectively inserted between mutually adjacent the dividing walls; and a plurality of armatures that are air-coil, and are disposed to be relatively rotatable with respect to the field portion at which the respective permanent magnets are retained in the retaining member;

wherein a thickness dimension d of the dividing walls is specified in accordance with the division number n and with a length dimension lm of one side of each of the permanent magnets in an arrangement direction, in a section cut along the magnetization directions of the permanent magnets, the length dimension lm being specified as a reference in advance;

wherein the thickness dimension d of the dividing walls satisfies the relationship $$0 < d \leq lm \times 1/(n+1) \times 1.5.$$

2. The rotating electrical machine according to claim 1, further comprising a ferromagnetic body formed in an annular shape opposing each of the permanent magnets of the field portion, the ferromagnetic body being provided to be relatively rotatable with respect to the field portion, and three-phase coils of the armature being arranged in the circumferential direction at a face of the ferromagnetic body at the side thereof at which the field portion is disposed.

3. The rotating electrical machine according to claim 1, wherein:

the field portion includes a first field portion and a second field portion disposed at the radial direction outer side of the first field portion, the plurality of the permanent magnets being arranged in the circumferential direction at the first field portion, the plurality of the permanent magnets being arranged in the circumferential direction at the second field portion, and the second field portion being rotatable integrally with the first field portion;

the retaining member includes a first retaining member that retains each of the plurality of permanent magnets of the first field portion and a second retaining member that retains each of the plurality of permanent magnets of the second field portion; and three-phase coils of the armature are arranged in the circumferential direction between the first field portion and the second field portion.

4. The rotating electrical machine according to claim 1, wherein the retaining member includes an inner periphery wall, respective inner periphery faces of the permanent magnets abutting against an outer periphery face of the inner periphery wall, and respective radial direction inner side ends of the dividing walls being connected to the outer periphery face.

5. A rotating electrical machine comprising:

a field portion including a plurality of permanent magnets arranged in a circumferential direction, with magnetization directions thereof being successively changed in steps of an angle that is a full cycle of electrical angles divided by a division number n, the division number n being any one integer that is at least three;

a retaining member that is a non-magnetic material, the retaining member including:

an annular outer periphery wall, respective outer periphery faces of the permanent magnets abutting against an inner periphery face of the outer periphery wall and, in the circumferential direction of the outer periphery wall, a plurality of dividing walls that respectively project to the inner side in the radial direction from the inner face of the outer periphery wall, the permanent magnets being respectively inserted between mutually adjacent the dividing walls; and a plurality of armatures that are air-coil, and are disposed to be relatively rotatable with respect to the field portion at which the respective permanent magnets are retained in the retaining member;

wherein a thickness dimension d of the dividing walls is specified in accordance with the division number n and with a length dimension lm of one side of each of the permanent magnets in an arrangement direction, in a section cut along the magnetization directions of the permanent magnets, the length dimension lm being specified as a reference in advance; wherein the thickness dimension d of the dividing walls satisfies the relationship $$d = lm/(n+1).$$

* * * * *